(12) United States Patent
Abbas et al.

(10) Patent No.: US 11,166,047 B2
(45) Date of Patent: *Nov. 2, 2021

(54) APPARATUS AND METHODS FOR VIDEO COMPRESSION

(71) Applicant: GoPro, Inc., San Mateo, CA (US)

(72) Inventors: Adeel Abbas, Belmont, CA (US); David Newman, San Diego, CA (US)

(73) Assignee: GoPro, Inc., San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/821,744

(22) Filed: Mar. 17, 2020

(65) Prior Publication Data
US 2020/0221135 A1 Jul. 9, 2020

Related U.S. Application Data

(63) Continuation of application No. 15/415,603, filed on Jan. 25, 2017, now Pat. No. 10,602,191.
(Continued)

(51) Int. Cl.
*H04N 19/86* (2014.01)
*H04N 19/597* (2014.01)
(Continued)

(52) U.S. Cl.
CPC .......... *H04N 19/86* (2014.11); *H04N 19/597* (2014.11); *H04N 19/82* (2014.11); *H04N 19/85* (2014.11);
(Continued)

(58) Field of Classification Search
CPC ........ H04N 19/82; H04N 19/85; H04N 19/86; H04N 19/597; H04N 5/341; H04N 5/23238
See application file for complete search history.

(56) References Cited

U.S. PATENT DOCUMENTS 8,606,073 B2 12/2013 Woodman
9,171,577 B1 10/2015 Newman
(Continued)

OTHER PUBLICATIONS

Achanta R., et al., 'Slic Superpixeis Gompared to State-of-the-Art Superpixei Methods,' IEEE Transactions on Pattern Analysis and Machine intelligence, 2012, vol. 34 (11), pp. 2274-2282.
(Continued)

*Primary Examiner* — Robert J Hance
(74) *Attorney, Agent, or Firm* — Young Basile Hanlon & MacFarlane, P.C.

(57) ABSTRACT

Panoramic content may be characterized by a wide field of view and large image size. Panoramic image may be mapped to cube projection. When encoding/decoding cube-projected images, the disclosure exploits content continuity between cube facets. One facet may be encoded/decoded independently from other facets to obtain a seed facet. One or more transformed versions of the seed facet may be obtained, for example, one corresponding to a 90° counterclockwise rotation, another to a 90° clockwise rotation, and one to an 180° rotation. Transformed versions may be used to form an augmented image. The remained facets of the cube may be encoded using transformed versions within the augmented image. Boundary filtering may be applied to one or more edges of one or more facets.

21 Claims, 11 Drawing Sheets

Related U.S. Application Data

(60) Provisional application No. 62/336,543, filed on May 13, 2016.

(51) Int. Cl.

| | |
|---|---|
| *H04N 19/85* | (2014.01) |
| *H04N 19/82* | (2014.01) |
| *H04N 5/341* | (2011.01) |
| *H04N 5/232* | (2006.01) |

(52) U.S. Cl.
CPC ......... *H04N 5/23238* (2013.01); *H04N 5/341* (2013.01)

(56) References Cited

U.S. PATENT DOCUMENTS

| | | | | |
|---|---|---|---|---|
| 9,575,803 | B2 | 2/2017 | Chauvet | |
| 2003/0007567 | A1 | 1/2003 | Newman | |
| 2015/0346832 | A1* | 12/2015 | Cole | H04L 65/4069 345/156 |
| 2016/0012855 | A1* | 1/2016 | Krishnan | G11B 27/105 386/241 |
| 2016/0028950 | A1* | 1/2016 | Perazzi | G06T 3/4038 348/38 |
| 2016/0105608 | A1* | 4/2016 | Pettegrew | H04N 5/23229 348/37 |
| 2016/0112704 | A1* | 4/2016 | Grange | H04N 19/61 375/240.12 |
| 2016/0112713 | A1* | 4/2016 | Russell | H04N 19/20 375/240.03 |
| 2016/0142697 | A1* | 5/2016 | Budagavi | H04N 13/156 348/43 |
| 2016/0274338 | A1 | 9/2016 | Davies | |
| 2016/0337706 | A1* | 11/2016 | Hwang | H04N 21/4382 |
| 2016/0352791 | A1* | 12/2016 | Adams | H04N 21/816 |
| 2017/0084073 | A1* | 3/2017 | Pio | G06T 15/20 |
| 2017/0085917 | A1* | 3/2017 | Hannuksela | H04N 19/523 |
| 2017/0270634 | A1* | 9/2017 | Eggebrecht | G06T 15/04 |
| 2017/0272758 | A1* | 9/2017 | Lin | H04N 19/117 |
| 2017/0323423 | A1* | 11/2017 | Lin | G06T 3/0062 |
| 2018/0199065 | A1* | 7/2018 | Adams | H04N 19/61 |

OTHER PUBLICATIONS

Allene C, et al., 'Seamless Image-based Texture Atlases Using Multi-band Blending,' Pattern Recognition, 2008. ICPR 2008. 19th International Conference on, 2008. 4 pages.

Badrinarayanan V., et al., 'Segnet: a Deep Convoiutional Encoder-Decoder Architecture for Image Segmentation,' arXiv preprint arXiv: 1511.00561, 2015. 14 pages.

Barghout L. and Sheynin J., 'Real-world scene perception and perceptual organization: Lessons from Computer Vision'. Journal of Vision, 2013, vol. 13 (9). (Abstract). 1 page.

Barghout L., 'Visual Taxometric approach Image Segmentation using Fuzzy-Spatial Taxon Cut Yields Contextually Relevant Regions,' Communications in Computer and Information Science (CCIS), Springer-Verlag, 2014, pp. 163-173.

Bay H., et al., 'Surf: Speeded up Robust Features,' European Conference on Computer Vision, Springer Berlin Heidelberg, 2006, pp. 404-417.

Beier et al., 'Feature-Based Image Metamorphosis,' in Computer Graphics Journal, Jul. 1992, vol. 28 (2), pp. 35-42.

Brainard R.C., et al., "Low-Resolution TV: Subjective Effects of Frame Repetition and Picture Replenishment," Bell Labs Technical Journal, Jan. 1967, vol. 46 (1), pp. 261-271.

Burt et al., 'A Multiresolution Spline with Application to Image Mosaics,' in ACM Transactions on Graphics (TOG), 1983, vol. 2, No. 4, pp. 217-236.

Chan et al., 'Active contours without edges'. IEEE Transactions on Image Processing, 2001, 10 (2), pp. 266-277 (hereinafter 'Chan').

Chang H., etal., 'Super-resolution Through Neighbor Embedding,' Computer Vision and Pattern Recognition, 2004. CVPR2004. Proceedings of the 2004 IEEE Computer Society Conference on, vol. 1, 2004. 8 pages.

Elen, 'Whatever happened to Ambisonics' AudioMedia Magazine, Nov. 1991. 18 pages.

Gracias, et al., 'Fast Image Blending Using Watersheds and Graph Cuts,' Image and Vision Computing, 2009, vol. 27 (5), pp. 597-607.

H.264 (Oct. 2012) and/or ISO/IEC 14496-10:2012, Information technology—Coding of audio-visual objects—Part 10: Advanced Video Coding, 402 pages.

Herbst E., et al., 'Occlusion Reasoning for Temporal Interpolation Using Optical Flow,' Department of Computer Science and Engineering, University of Washington, Tech. Rep. UW-CSE-09-08-01,2009. 41 pages.

High Efficiency Video Coding (HEVC), also known as H.265 (described in e.g., ITU-T Study Group 16—Video Coding Experts Group (VCEG)—ITU-T H.265, and/or ISO/IEC JTC 1/SC 29/WG 11 Motion Picture Experts Group (MPEG)—the HEVC standard ISO/IEC 23008-2:2015, 657 pages.

Jakubowski M., et al, 'Block-based motion estimation algorithmsa survey,' Opto-Eiectronics Review 21, No. 1 (2013), pp. 88-102.

Kendall A., et al., 'Bayesian Segnet: Model Uncertainty in Deep Convolutional Encoder-Decoder Architectures for Scene Understanding,' arXiv: 1511.02680, 2015. (11 pages).

Lowe D.G., 'Object Recognition From Local Scale-invariant Features,' Computer vision, The proceedings of the seventh IEEE international conference on 1999, vol. 2, pp. 1150-1157.

Mitzel D., et al., 'Video Super Resolution Using Duality Based TV-I1 Optical Flow,' Joint Pattern Recognition Symposium, 2009, pp. 432-441.

Perez et al., 'Poisson Image Editing,' in ACM Transactions on Graphics (TOG), 2003, vol. 22, No. 3, pp. 313-318.

Schick A., et al., "Improving Foreground Segmentations with Probabilistic Superpixel Markov Random Fields," 2012 IEEE Computer Society Conference on Computer Vision and Pattern Recognition Workshops, 2012, pp. 27-31.

Schwartz, E., et al., "Implementation of Compression with Reversible Embedded Wavelets," In Proc. SPIE, 1995, 12 pages.

Suzuki et al., 'Inter Frame Coding with Template Matching Averaging,' in IEEE international Conference on Image Processing Proceedings (2007), vol. (iII), pp. 409-412.

Szeliski R., "Computer Vision: Algorithms and Applications," Springer Science & Business Media, 2010, 979 pages.

Thaipanich T., et al., "Low Complexity Algorithms for Robust Video frame rate up-conversion (FRUC) technique," IEEE Transactions on Consumer Electronics, Feb. 2009, vol. 55 (1),pp. 220-228.

Vass, J., et al., 'Efficient Three-Dimensional Wavelet Codecs for Networked Video Communication,' in Proceedings of IEEE International Conference on Image Processing, Kobe, Japan, Oct. 1999, pp. 565-569.

Xiao, et al., 'Multiple View Semantic Segmentation for Street View Images,' 2009 IEEE 12th International Conference on Computer Vision, 2009, pp. 686-693.

Xiong Y et ai 'Gradient Domain Image Blending and Implementation on Mobile Devices,' International Conference on Mobile Computing, Applications, and Services, Springer Berlin Heidelberg, 2009, pp. 293-306.

Zhai et al., "A Low Complexity Motion Compensated Frame Interpolation Method," in IEEE International Symposium on Circuits and Systems (2005), pp. 4927-4930.

Zhang., "A Flexible New Technique for Camera Calibration" IEEE Transactions, dated Nov. 2000, vol. 22, No. 11, pp. 1330-1334.

\* cited by examiner

APPARATUS AND METHODS FOR VIDEO COMPRESSION

PRIORITY

This application is a continuation of and claims the benefit of priority to U.S. patent application Ser. No. 15/415,603 of the same title filed on Jan. 25, 2017, issuing as U.S. Pat. No. 10,602,191 on Mar. 24, 2020, which claims the benefit of priority to U.S. Provisional Patent Application Ser. No. 62/336,543 of the same title filed on May 13, 2016, each of the foregoing being incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE DISCLOSURE

Field of the Disclosure

The present disclosure relates generally to storing and/or presenting of image and/or video content and more particularly in one exemplary aspect to encoding, decoding, and/or transmission of video content.

Description of Related Art

Virtual reality (VR) video/image content and/or panoramic video/image content may include bit streams characterized by high resolution and high data rates (e.g., 8K resolution in excess of 10 megabits per second (mbps)). Users may be viewing high data rate content on a resource limited device (e.g., battery operated computer, a tablet, smartphone or a head mounted display) and/or other devices that may be characterized by a given amount of available energy, data transmission bandwidth, and/or computational capacity. Using existing technologies, resources available to such resource limited devices may prove inadequate for receiving content at such high resolution and/or high bitrate.

Moreover, prior techniques for the encoding/decoding of, for example, VR video/image content and/or panoramic video/image content may not be suitable for, for example, these resource limited devices. Accordingly, techniques are needed in order to further optimize compression techniques for the encoding/decoding of this VR video/image content and/or panoramic video/image content in order to allow, for example, modern display devices to perform to their capabilities when displaying, inter alia, encoded/decoded VR video/image content and/or panoramic video/image content.

SUMMARY

The present disclosure satisfies the foregoing needs by providing, inter alia, methods and apparatus for the encoding/decoding of, for example, VR video/image content and/or panoramic video/image content.

In a first aspect, a system for boundary filtering of encoded/decoded images to reduce artifacts at image boundaries is disclosed. In one embodiment, the system includes an electronic storage device configured to store computer executable instructions; and one or more physical processors configured to execute the computer executable instructions, the computer executable instructions configured to, when executed by the one or more physical processors: obtain an encoded partitioned image, the encoded partitioned image comprising at least a first image facet and a second image facet, the first image facet comprising a first edge and the second image facet comprising a second edge, the first edge and the second edge defining a projection boundary, the first image facet being encoded independently from the second image facet; reconstruct the encoded partitioned image by decoding the first image facet and the second image facet; identify a first set of pixels of the first image facet that are spatially near or adjacent to the first edge of the first image facet; transpose the first set of pixels such that the first edge of the first image facet is disposed adjacent to the second edge of the second image facet in accordance with the projection boundary; and apply a filter to the second edge of the second image facet using the transposed first set of pixels.

In one variant, the filter includes an in-loop filter.

In another variant, a position of the transposed first set of pixels is adjacent the second edge but not within the second image facet.

In yet another variant, a position of the transposed first set of pixels cause the transposed first set of pixels to overlap a portion of the second image facet at the second edge.

In yet another variant, the encoded partitioned image includes a convex regular polygon projection and the first and second image facets comprise respective faces of the convex regular polygon projection.

In yet another variant, the convex regular polygon projection comprises a cube projection.

In yet another variant, the transposed first set of pixels are rotated by either: (1) ninety degrees in a clockwise direction; (2) ninety degrees in a counter-clockwise direction; or (3) one-hundred and eighty degrees.

In yet another variant, the application of the filter includes the application of a smoothing filter that is applied to the projection boundary in order to eliminate artifacts which may occur as a result of encoding/decoding individual facets at different instances.

In a second aspect, methods for image encoding and/or image decoding are disclosed. In one embodiment, the method includes partitioning an image into a plurality of image facets of a convex regular polygon projection; independently encoding at least a portion of the plurality of image facets; and separately encoding another portion of the image based on a transformed version of an image facet of the partitioned image.

In one variant, the image includes a panoramic image and the partitioning of the image into the plurality of image facets includes partitioning the panoramic image into a first portion and a second portion.

In another variant, the independently encoded portion of the plurality of image facets includes independently encoding the first portion of the panoramic image.

In yet another variant, the method further includes obtaining a transformed version of the encoded first portion of the panoramic image.

In yet another variant, the method further includes encoding the second portion of the panoramic image based at least in part on the transformed version of the encoded first portion of the panoramic image.

In yet another variant, the method further includes obtaining an encoded image based on the encoded first portion of the panoramic image and the encoded second portion of the image.

In a third aspect, a computerized apparatus configured to encode and/or decode an image are disclosed. In one embodiment, the computerized apparatus includes an electronic storage apparatus configured to store a panoramic image; and logic configured to: partition the panoramic image into a plurality of portions; independently decode a portion of the panoramic image; obtain a transformed version of the independently decoded portion of the panoramic image; and decode another portion of the panoramic image based on the transformed version of the independently decoded portion of the panoramic image.

In one variant, the transformed version of the independently decoded portion of the panoramic image comprises a rotated and/or translated portion of the portion of the panoramic image.

In another variant, the panoramic image is partitioned in accordance with a convex regular polygon projection and the portion of the panoramic image includes a first face of the convex regular polygon projection.

In yet another variant, the decoded another portion of the panoramic image includes a second face of the convex regular polygon projection.

In yet another variant, the first face of the convex regular polygon projection and the second face of the convex regular polygon projection share a common boundary region.

In yet another variant, the logic is configured to apply a filter to at least a portion of the common boundary region.

In a fourth aspect, a computer readable storage apparatus configured to encode and/or decode an image or sequence of images is disclosed. In one embodiment, the computer readable storage apparatus includes a storage medium configured to store computer executable instructions, the computer executable instructions configured to, when executed: obtain an encoded partitioned image, the encoded partitioned image comprising at least a first image facet and a second image facet, the first image facet comprising a first edge and the second image facet comprising a second edge, the first edge and the second edge defining a projection boundary, the first image facet being encoded independently from the second image facet; reconstruct the encoded partitioned image by decoding the first image facet and the second image facet; identify a first set of pixels of the first image facet that are spatially near or adjacent to the first edge of the first image facet; transpose the first set of pixels such that the first edge of the first image facet is disposed adjacent to the second edge of the second image facet in accordance with the projection boundary; and apply a filter to the second edge of the second image facet using the transposed first set of pixels.

In a fifth aspect, an integrated circuit configured to encode and/or decode an image or a sequence of images is disclosed. In one embodiment, the integrated circuit includes logic configured to partition a panoramic image into portions; independently decode a portion of the panoramic image; obtain a transformed version of the independently decoded portion of the panoramic image; and decode another portion of the panoramic image based on the transformed version of the independently decoded portion of the panoramic image.

Other features and advantages of the present disclosure will immediately be recognized by persons of ordinary skill in the art with reference to the attached drawings and detailed description of exemplary implementations as given below.

All Figures disclosed herein are © Copyright 2017 GoPro Inc. All rights reserved.

DETAILED DESCRIPTION

Implementations of the present technology will now be described in detail with reference to the drawings, which are provided as illustrative examples so as to enable those skilled in the art to practice the technology. Notably, the figures and examples below are not meant to limit the scope of the present disclosure to a single implementation or implementations, but other implementations are possible by way of interchange of or combination with some or all of the described or illustrated elements. Wherever convenient, the Systems and methods for encoding panoramic imaging content are provided. Panoramic content (e.g., content captured using 180 degree, 360-degree view field and/or other fields of view) and/or virtual reality (VR) content, may be characterized by high image resolution (e.g., 7680×4320 pixels (8K)) and/or high bit rates (e.g., up to 100 megabits per second (mbps)). Imaging content characterized by full circle coverage (e.g., 180°×360° or 360°×360° field of view) may be referred to as spherical content. Presently available standard video compression codecs, e.g., H.264 (described in ITU-T H.264 (01/2012) and/or ISO/IEC 14496-10:2012, Information technology—Coding of audio-visual objects— Part 10: Advanced Video Coding, each of the foregoing incorporated herein by reference in its entirety), High Efficiency Video Coding (HEVC), also known as H.265, described in e.g., ITU-T Study Group 16—Video Coding Experts Group (VCEG)—ITU-T H.265, and/or ISO/IEC JTC 1/SC 29/WG 11 Motion Picture Experts Group (MPEG)—publishes the HEVC standard as ISO/IEC 23008-2:2015, each of the foregoing incorporated herein by reference in its entirety, and/or VP9 video codec, described at e.g., http://www.webmproject.org/vp9, the foregoing incorporated herein by reference in its entirety), may prove non-optimal for distributing and decoding panoramic content on a resource limited devices.

Panoramic, and/or virtual reality content may be viewed by a client device using a viewport into the extent of the panoramic image. In some implementations, viewing dimension(s) of the viewport may be configured smaller than the extent dimension(s) of the content (e.g., a viewport covering 1000 pixel wide by 700 pixel in height area may be used to view content that was obtained over area 1100 pixels in width and 3000 pixels in height).

When viewing panoramic and/or VR content using a viewport, the server may send (and the decoder may decode) a portion of high resolution video. The area where the user is looking may be in high resolution and rest of the image may be in low resolution. When the viewer moves his/her viewport, the decoder may ask the server to transmit video data corresponding to updated viewpoint.

Figure 1:
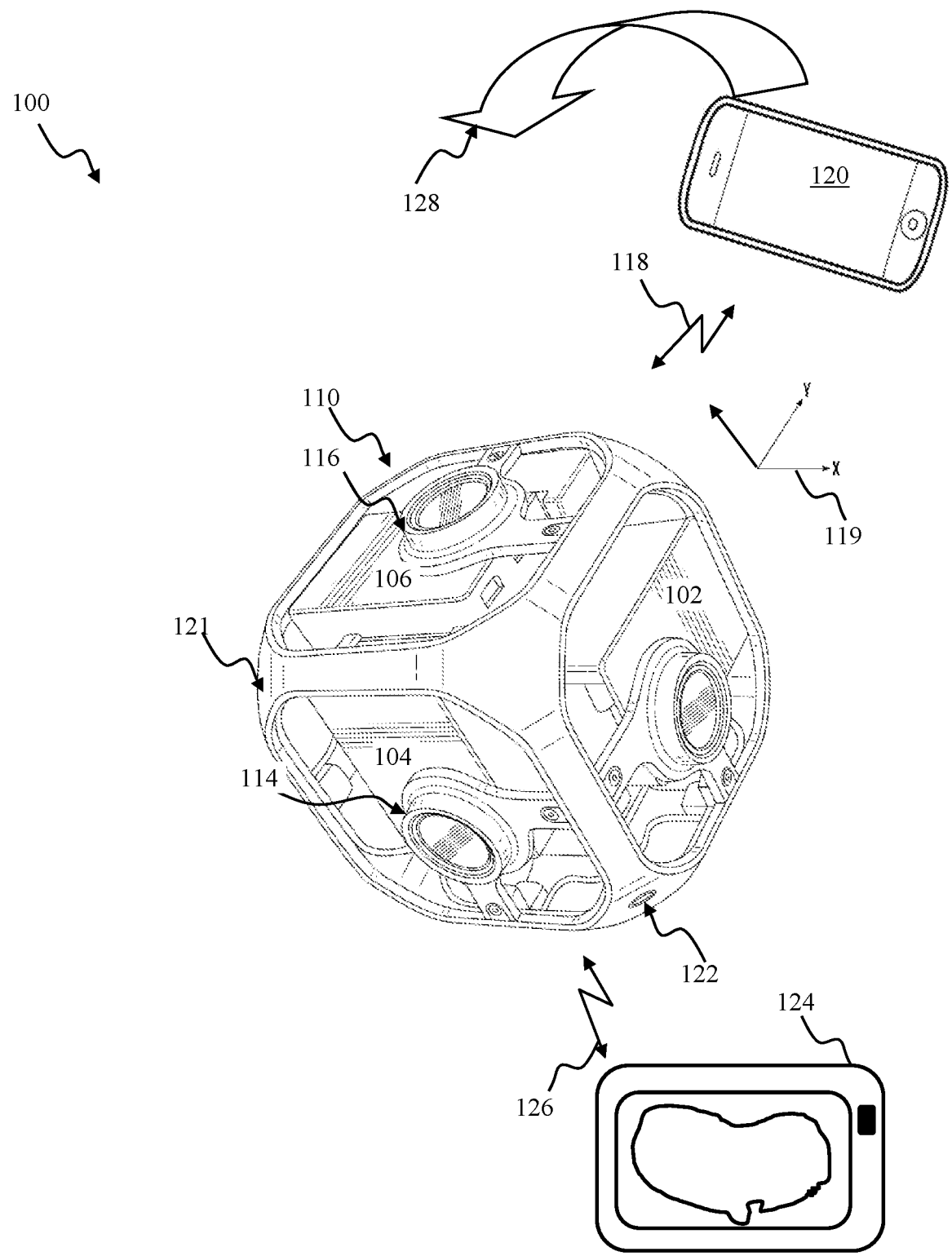
FIG. 1 is a functional block diagram illustrating a system for panoramic content capture and viewing in accordance with one implementation.

FIG. 1 illustrates an exemplary image/video capture system configured for acquiring panoramic content, in accordance with one implementation. The system 100 of FIG. 1A may include capture apparatus 110, such as e.g., GoPro® activity camera, e.g., HERO4 Silver™, and/or other image capture devices.

The exemplary capture apparatus 110 may include 6-cameras (e.g., 104, 106, 102) disposed in a prescribed configuration or relationship; e.g., cube-shaped cage 120 as shown. The cage 120 dimensions in this implementation are selected to be between 25 mm and 150 mm, preferably 105 mm in some particular implementations. The cage 120 may be outfitted with a mounting port 122 configured to enable attachment of the capture apparatus to a supporting structure (e.g., a tripod, a photo stick). The cage 120 may provide a rigid support structure. Use of a rigid structure may ensure that orientation of individual cameras with respect to one another may remain constant, or a given configuration maintained during operation of the apparatus 110.

Individual capture devices (e.g., 102) may include for instance a video camera device, such as described in, e.g., such as described in U.S. patent application Ser. No. 14/920,427 entitled "APPARATUS AND METHODS FOR EMBEDDING METADATA INTO VIDEO STREAM" filed on Oct. 22, 2015, the foregoing being incorporated herein by reference in its entirety.

In some implementations, the capture device may include two camera components (including a lens and imaging sensors) that are disposed in a Janus configuration, i.e., back to back such as described in U.S. patent application Ser. No. 29/548,661, entitled "MULTI-LENS CAMERA" filed on Dec. 15, 2015, the foregoing being incorporated herein by reference in its entirety, although it is appreciated that other configurations may be used.

The capture apparatus 110 may be configured to obtain imaging content (e.g., images and/or video) with a prescribed field of view (FOV), up to and including a 360° field of view (whether in one dimension or throughout all dimensions), also referred to as panoramic or spherical content, e.g., such as shown and described in U.S. patent application Ser. No. 14/949,786, entitled "APPARATUS AND METHODS FOR IMAGE ALIGNMENT" filed on Nov. 23, 2015, and/or U.S. patent application Ser. No. 14/927,343, entitled "APPARATUS AND METHODS FOR ROLLING SHUTTER COMPENSATION FOR MULTI-CAMERA SYSTEMS", filed Oct. 29, 2015, each of the foregoing being incorporated herein by reference in its entirety.

Individual cameras (e.g., 102, 104, 106) may be characterized by, for example, a prescribed field of view (e.g.,) 120° in a longitudinal dimension, and another field of view (e.g.,) 90° in a latitudinal dimension. In order to provide for an increased overlap between images obtained with adjacent cameras, image sensors of any two adjacent cameras may be configured at 90° with respect to one another. By way of non-limiting illustration, the longitudinal dimension of the camera 102 sensor may be oriented at 90° with respect to the longitudinal dimension of the camera 104 sensor; the longitudinal dimension of camera 106 sensor may be oriented at 90° with respect to the longitudinal dimension 116 of the camera 104 sensor. The camera sensor configuration illustrated in FIG. 1A, may provide for 420° angular coverage in vertical and/or horizontal planes. Overlap between fields of view of adjacent cameras may provide for an improved alignment and/or stitching of multiple source images to produce, e.g., a panoramic image, particularly when source images may be obtained with a moving capture device (e.g., rotating camera).

Individual cameras of the apparatus 110 may comprise a lens e.g., lens 114 of the camera 104, lens 116 of the camera 106. In some implementations, the individual lens may be characterized by what is referred to as "fisheye" pattern and produce images characterized by fish eye (or near-fish eye) field of view (FOV). Images captured by two or more individual cameras of the apparatus 110 may be combined using stitching of fisheye projections of captured images to produce an equirectangular planar image, in some implementations, e.g., such as shown in U.S. patent application Ser. No. 14/920,427 entitled "APPARATUS AND METHODS FOR EMBEDDING METADATA INTO VIDEO STREAM" filed on 22 Oct. 2015, incorporated supra. In some embodiments, images captured by two or more cameras may be directly stitched to some other projection, e.g., cubic projection.

The capture apparatus 110 may house one or more internal metadata sources, e.g., video, inertial measurement unit, global positioning system (GPS) receiver component and/or other metadata source. In some implementations, the capture apparatus 110 may comprise a device described in detail in U.S. patent application Ser. No. 14/920,427, entitled "APPARATUS AND METHODS FOR EMBEDDING METADATA INTO VIDEO STREAM" filed on 22 Oct.

2015, incorporated supra. The capture apparatus 110 may comprise one or optical elements 102. Individual optical elements may include, by way of non-limiting example, one or more of standard lens, macro lens, zoom lens, special-purpose lens, telephoto lens, prime lens, achromatic lens, apochromatic lens, process lens, wide-angle lens, ultra-wide-angle lens, fisheye lens, infrared lens, ultraviolet lens, perspective control lens, other lens, and/or other optical element.

The capture apparatus 110 may include one or more image sensors including, by way of non-limiting example, one or more of charge-coupled device (CCD) sensor, active pixel sensor (APS), complementary metal-oxide semiconductor (CMOS) sensor, N-type metal-oxide-semiconductor (NMOS) sensor, and/or other image sensors. The capture apparatus 110 may include one or more microphones configured to provide audio information that may be associated with images being acquired by the image sensor.

The capture apparatus 110 may be interfaced to an external metadata source 124 (e.g., GPS receiver, cycling computer, metadata puck, and/or other device configured to provide information related to system 100 and/or its environment) via a remote link 126. The capture apparatus 110 may interface to an external user interface device 120 via the link 118. In some implementations, the device 120 may correspond to a smartphone, a tablet computer, a phablet, a smart watch, a portable computer, and/or other device configured to receive user input and communicate information with the camera capture device 110. In some implementations, the capture apparatus 110 may be configured to provide panoramic content (or portion thereof) to the device 120 for viewing.

In one or more implementations, individual links 126, 118 may utilize a wireless interface configuration, e.g., Wi-Fi™, Bluetooth® (BT), cellular data link, ZigBee®, near field communications (NFC) link, e.g., using ISO/IEC 14443 protocol, ANT+ link, and/or other wireless communications link. In some implementations, individual links 126, 118 may be effectuated using a wired interface, e.g., HDMI™, USB™, digital video interface (DVI™), DisplayPort® interface (e.g., digital display interface developed by the Video Electronics Standards Association (VESA)®, Ethernet™, Thunderbolt™), and/or other interface.

In some implementations (not shown) one or more external metadata devices may interface to the apparatus 110 via a wired link, e.g., HDMI, USB, coaxial audio, and/or other interface. In one or more implementations, the capture apparatus 110 may house one or more sensors (e.g., GPS, pressure, temperature, heart rate, and/or other sensors). The metadata obtained by the capture apparatus 110 may be incorporated into the combined multimedia stream using any applicable methodologies including those described in U.S. patent application Ser. No. 14/920,427 entitled "APPARATUS AND METHODS FOR EMBEDDING METADATA INTO VIDEO STREAM" filed on 22 Oct. 2015, incorporated supra.

The user interface device 120 may operate a software application (e.g., GoPro Studio, GoPro App, and/or other application) configured to perform a variety of operations related to camera configuration, control of video acquisition, and/or display of video captured by the camera apparatus 110. An application (e.g., GoPro App) may enable a user to create short video clips and share clips to a cloud service (e.g., Instagram®, Facebook®, YouTube®, Dropbox®); perform full remote control of camera 110 functions, live preview video being captured for shot framing, mark key moments while recording with HiLight Tag, View HiLight Tags in GoPro Camera Roll for location and/or playback of video highlights, wirelessly control camera software, and/or perform other functions. Various methodologies may be utilized for configuring the camera apparatus 110 and/or displaying the captured information, including those described in U.S. Pat. No. 8,606,073, entitled "BROADCAST MANAGEMENT SYSTEM", issued Dec. 10, 2013, the foregoing being incorporated herein by reference in its entirety.

By way of an illustration, the device 120 may receive user setting characterizing image resolution (e.g., 3840 pixels by 2160 pixels), frame rate (e.g., 60 frames per second (fps)), and/or other settings (e.g., location) related to the activity (e.g., mountain biking) being captured. The user interface device 120 may communicate the settings to the camera apparatus 110.

A user may utilize the device 120 to view content acquired by the capture apparatus 110. Display of the device 120 may act as a viewport into 3D space of the panoramic content. In some implementation, the user interface device 120 may communicate additional information (e.g., metadata) to the camera apparatus 110. By way of an illustration, the device 120 may provide orientation of the device 120 with respect to a given coordinate system 119, to the apparatus 110 so as to enable determination of a viewport location and/or dimensions for viewing of a portion of the panoramic content. By way of an illustration, a user may rotate (e.g., sweep) the device 120 through an arc in space (as illustrated by arrow 128 in FIG. 1). The device 120 may communicate display orientation information to the capture apparatus 110. The capture apparatus 110 may provide an encoded bit stream configured to enable viewing of a portion of the panoramic content corresponding to a portion of the environment of the display location as it traverses the path 128.

The capture apparatus 110 may include a display configured to provide information related to camera operation mode (e.g., image resolution, frame rate, capture mode (sensor, video, photo), connection status (connected, wireless, wired connection), power mode (e.g., standby, sensor mode, video mode), information related to metadata sources (e.g., heart rate, GPS), and/or other information. The capture apparatus 110 may include a user interface component (e.g., one or more buttons) configured to enable user to start, stop, pause, resume sensor and/or content capture. User commands may be encoded using a variety of approaches including but not limited to duration of button press (pulse width modulation), number of button presses (pulse code modulation) and/or a combination thereof. By way of an illustration, two short button presses may initiate sensor acquisition mode described in detail elsewhere; single short button press may be used to (i) communicate initiation of video and/or photo capture and cessation of video and/or photo capture (toggle mode); or (ii) video and/or photo capture for a given time duration or number of frames (burst capture). It will be recognized by those skilled in the arts that various user command communication implementations may be realized, e.g., short/long button presses.

Figure 2:
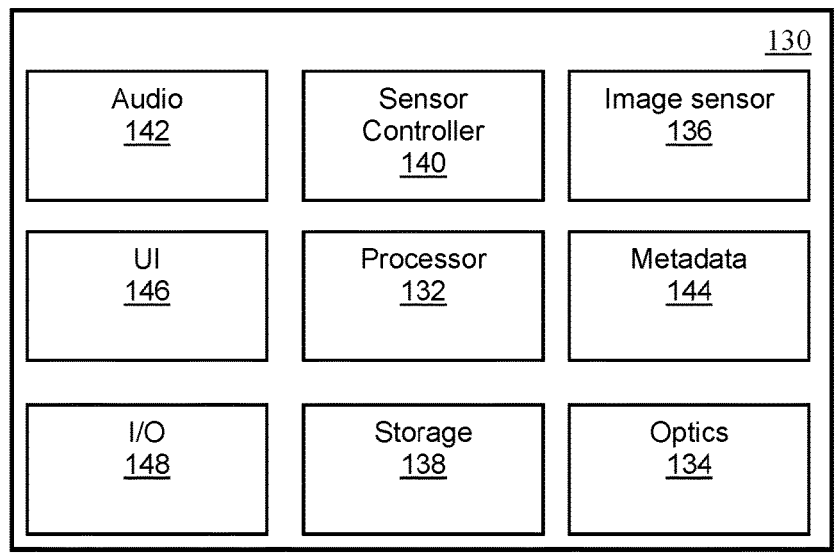
FIG. 2 is a functional block diagram illustrating a capture device for use with, e.g., system of FIG. 1 in accordance with one implementation.

FIG. 2 illustrates one implementation of a camera apparatus for collecting metadata and content. The apparatus of FIG. 2 may comprise a capture device 130 that may include one or more processors 132 (such as a system on a chip (SOC), a microcontroller, a microprocessor, a CPU, a DSP, an ASIC, a GPU, and/or other processors) that control the operation and functionality of the capture device 130. In some implementations, the capture device 130 in FIG. 2 may correspond to an action camera configured to capture photo, video and/or audio content.

The capture device 130 may include an optics module 134. In one or more implementations, the optics module 134 may include, by way of non-limiting example, one or more of a standard lens, macro lens, zoom lens, special-purpose lens, telephoto lens, prime lens, achromatic lens, apochromatic lens, process lens, wide-angle lens, ultra-wide-angle lens, fisheye lens, infrared lens, ultraviolet lens, perspective control lens, other lens, and/or other optics components. In some implementations, the optics module 134 may implement focus controller functionality configured to control the operation and configuration of the camera lens. The optics module 134 may receive light from an object and couple received light to an image sensor 136. The image sensor 136 may include, by way of non-limiting example, one or more of charge-coupled device sensor, active pixel sensor, complementary metal-oxide semiconductor sensor, N-type metal-oxide-semiconductor sensor, and/or other image sensor. The image sensor 136 may be configured to capture light waves gathered by the optics module 134 and to produce image(s) data based on control signals from the sensor controller module 140. Optics module 134 may comprise focus controller configured to control the operation and configuration of the lens. The image sensor may be configured to generate a first output signal conveying first visual information regarding the object. The visual information may include, by way of non-limiting example, one or more of an image, a video, and/or other visual information. The optical element, and the first image sensor may be embodied in a housing.

In some implementations, the image sensor module 136 may include, without limitation, video sensors, audio sensors, capacitive sensors, radio sensors, vibrational sensors, ultrasonic sensors, infrared sensors, radar, LIDAR and/or sonars, and/or other sensory devices.

The capture device 130 may include one or more audio components (e.g., microphone(s) embodied within the camera (e.g., audio module 142). Microphone(s) may provide audio content information.

The capture device 130 may include a sensor controller module 140. The sensor controller module 140 may be used to operate the image sensor 136. The sensor controller module 140 may receive image or video input from the image sensor 136; audio information from one or more microphones, such as from audio module 142. In some implementations, audio information may be encoded using audio coding format, e.g., AAC, AC3, MP3, linear PCM, MPEG-H and or other audio coding format (audio codec). In one or more implementations of spherical video and/or audio, the audio codec may comprise a 3-dimensional audio codec, e.g., Ambisonics such as described at http://www.ambisonic.net/and/or http://www.digitalbrainstorming.ch/db_data/eve/ambisonics/text01.pdf, the foregoing being incorporated herein by reference in its entirety.

The capture device 130 may include one or more metadata modules embodied (e.g., metadata module 144) within the camera housing and/or disposed externally to the camera. The processor 132 may interface to the sensor controller and/or one or more metadata modules 144. Metadata module 144 may include sensors such as an inertial measurement unit (IMU) including one or more accelerometers and/or gyroscopes, a magnetometer, a compass, a global positioning system (GPS) sensor, an altimeter, ambient light sensor, temperature sensor, and/or other sensors. The capture device 130 may contain one or more other metadata/telemetry sources, e.g., image sensor parameters, battery monitor, storage parameters, and/or other information related to camera operation and/or capture of content.

Metadata module 144 may obtain information related to the environment of the capture device and aspect in which the content is captured. By way of a non-limiting example, an accelerometer may provide device motion information, comprising velocity and/or acceleration vectors representative of motion of the capture device 130; the gyroscope may provide orientation information describing the orientation of the device 130, the GPS sensor may provide GPS coordinates, time, identifying the location of the capture device 130; and the altimeter may obtain the altitude of the camera 130. In some implementations, internal metadata module 144 may be rigidly coupled to the capture device 130 housing such that any motion, orientation or change in location experienced by the capture device 130 is also experienced by the metadata sensors 144.

The sensor controller module 140 and/or processor 132 may be operable to synchronize various types of information received from the metadata sources. For example, timing information may be associated with the sensor data. Using the timing information, metadata information may be related to content (photo/video) captured by the image sensor 136. In some implementations, the metadata capture may be decoupled form video/image capture. That is, metadata may be stored before, after, and in-between one or more video clips and/or images. In one or more implementations, the sensor controller module 140 and/or the processor 132 may perform operations on the received metadata to generate additional metadata information. For example, the microcontroller may integrate the received acceleration information to determine the velocity profile of the capture device 130 during the recording of a video. In some implementations, video information may consist of multiple frames of pixels using any applicable encoding method (e.g., H262, H.264, Cineform and/or other standard).

The capture device 130 may include electronic storage 138. The electronic storage 138 may comprise a system memory module is configured to store executable computer instructions that, when executed by the processor 132, perform various camera functionalities including those described herein. The electronic storage 138 may comprise storage memory configured to store content (e.g., metadata, images, audio) captured by the apparatus.

The electronic storage 138 may include non-transitory memory configured to store configuration information and/or processing code configured to enable, e.g., video information, metadata capture and/or to produce a multimedia stream comprised of, e.g., a video track and metadata in accordance with the methodology of the present disclosure. In one or more implementations, the processing configuration may comprise capture type (video, still images), image resolution, frame rate, burst setting, white balance, recording configuration (e.g., loop mode), audio track configuration, and/or other parameters that may be associated with audio, video and/or metadata capture. Additional memory may be available for other hardware/firmware/software needs of the capture device 130. The processor 132 may interface to the sensor controller module 140 in order to obtain and process sensory information for, e.g., object detection, face tracking, stereo vision, and/or other tasks.

The processor 132 may interface with the mechanical, electrical sensory, power, and user interface 146 modules via driver interfaces and/or software abstraction layers. Additional processing and memory capacity may be used to support these processes. It will be appreciated that these components may be fully controlled by the processor 132. In some implementation, one or more components may be operable by one or more other control processes (e.g., a GPS receiver may comprise a processing apparatus configured to provide position and/or motion information to the processor 132 in accordance with a given schedule (e.g., values of latitude, longitude, and elevation at 10 Hz)).

The memory and processing capacity may aid in management of processing configuration (e.g., loading, replacement), operations during a startup, and/or other operations. Consistent with the present disclosure, the various components of the system may be remotely disposed from one another, and/or aggregated. For example, one or more sensor components may be disposed distal from the capture device, e.g., such as shown and describe with respect to FIG. 1. Multiple mechanical, sensory, or electrical units may be controlled by a learning apparatus via network/radio connectivity.

The capture device 130 may include a user interface (UI) module 146. The UI module 146 may include virtually any type of device capable of registering inputs from, and/or communicating outputs to, a user. These may include, without limitation, display, touch, proximity sensitive interface, light, sound receiving/emitting devices, wired/wireless input devices and/or other devices. The UI module 146 may include a display, one or more tactile elements (e.g., buttons and/or virtual touch screen buttons), lights (e.g., LEDs), speaker, and/or other UI elements. The UI module 146 may be operable to receive user input and/or provide information to a user related to operation of the camera apparatus 130.

The capture device 130 may include an input/output (I/O) interface module 148. The I/O interface module 148 may be configured to synchronize the capture device 130 with other cameras and/or with other external devices, such as a remote control, a second capture device 130, a smartphone, a client device 120 of FIG. 1 and/or a video server. The I/O interface module 148 may be configured to communicate information to/from various I/O components. In some implementations the I/O interface module 148 may comprise a wired and/or wireless communications interface (e.g. WiFi, Bluetooth, USB, HDMI, Wireless USB, Near Field Communication (NFC), Ethernet, a radio frequency transceiver, and/or other interfaces) configured to communicate to one or more external devices (e.g., devices 124, 120 in FIG. 1 and/or metadata source). In some implementations, the I/O interface module 148 may interface with LED lights, a display, a button, a microphone, speakers, and/or other I/O components. In one or more implementations, the I/O interface module 148 may interface to energy source, e.g., battery and/or DC electrical source. The communications interface of the capture device 130 may include one or more connections to external computerized devices to allow for, inter alia, configuration and/or management of remote devices e.g., as described above with respect to FIG. 1 and/or with respect to FIG. 2. The connections may include any of the wireless or wireline interfaces discussed above, and further may include customized or proprietary connections for specific applications. In some implementations, the communications interface may comprise a component (e.g., a dongle), comprising an infrared sensor, a radio frequency antenna, ultrasonic transducer, and/or other communications interfaces. In one or more implementation, the communications interface may comprise a local (e.g., Bluetooth, Wi-Fi) and/or broad range (e.g., cellular LTE) communications interface configured to enable communications between the capture device (e.g., 110 in FIG. 1) and a remote device (e.g., 120 in FIG. 1).

The capture device 130 may include a power system that may be tailored to the needs of the application of the device. For example, for a small-sized lower power action camera, a wireless power solution (e.g. battery, solar cell, inductive (contactless) power source, rectification, and/or other) may be used.

Figure 3:
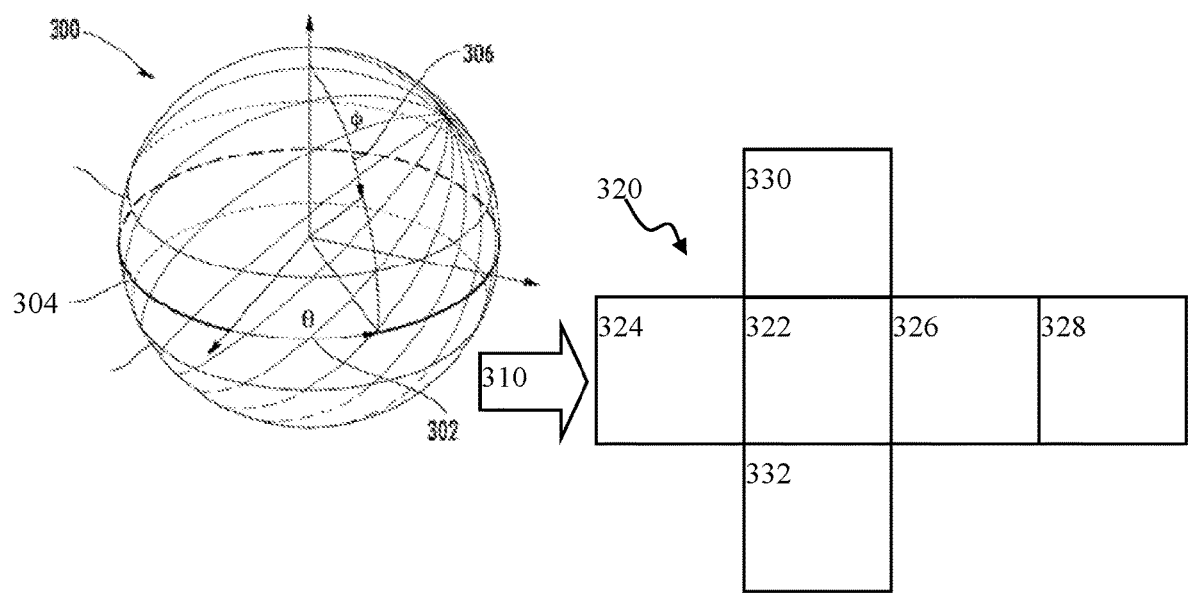
FIG. 3 is a graphical illustration depicting spherical to cube image projection, in accordance with one implementation.

FIG. 3 illustrates spherical coordinate system 300 useful for characterizing image transformation of the disclosure in accordance with one implementation. Spherical angle θ, denoted by arrow 302 in FIG. 3 may be used to denote location of a pixel along the iso-line 304 in FIG. 3. Spherical angle d), denoted by arrow 306 in FIG. 3 may be used to denote a location away from the equator 304.

Figure 8:
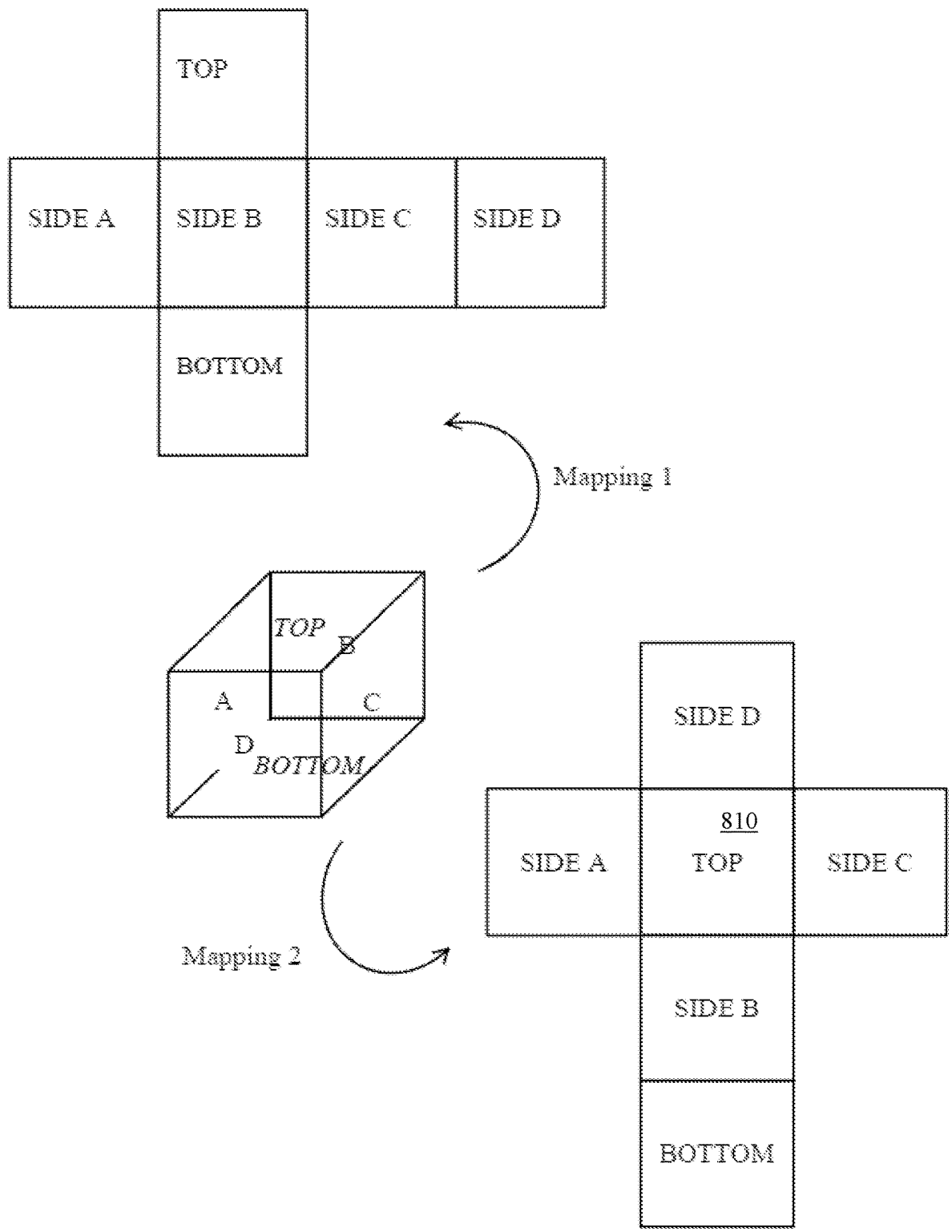
FIG. 8 is a graphical illustration depicting exemplary cube projection configurations for use with encoding methodology of the disclosure, in accordance with one implementation.

In some implementations, representation of the environment may be mapped into a cube projection 320. Some projections may include a spherical to cube mapping denoted by arrow 310 in FIG. 3. In one or more implementations, the cube projection may be obtained by, e.g., assigning the output of individual cameras of apparatus 110 of FIG. 1 to a respective facet of projection 320. By way of an illustration, output of forward looking camera 102 may be assigned to facet 322, output of upward looking camera 106 may be assigned as facet 330, output of camera 104 to facet 326, output of other cameras of the apparatus 130 may be assigned to facets 324, 328, 332. FIG. 8 is a graphical illustration depicting exemplary cube projection configurations for use with encoding methodology of the disclosure, in accordance with one implementation. In some implementations, cube projection of visual environment may be configured in accordance with configuration of FIG. 4A, wherein the top facet (e.g., upward looking view) may be placed at the top of the projection (e.g., facet 410 in FIG. 4A). In one or more implementations, the up view may be placed in the middle, as shown by facet 810 in FIG. 8. It will be recognized by those skilled in the arts that various other configurations of cube projection may be utilized.

Figure 4A:
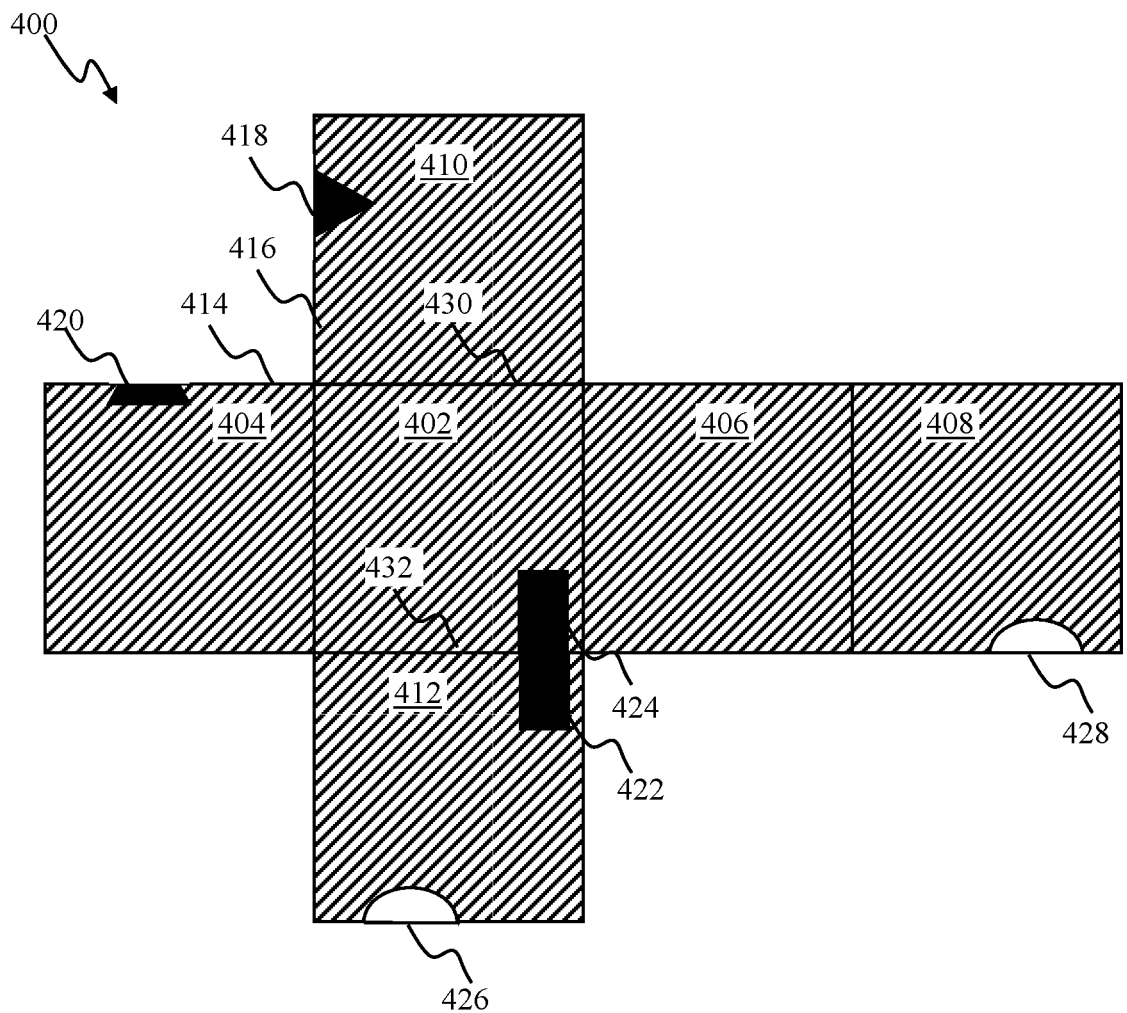
FIG. 4A is a graphical illustration depicting an exemplary cube projection of a panoramic image for use with encoding methodology of the disclosure, in accordance with one implementation.

FIG. 4A presents an exemplary encoding/decoding of cube-projected images using the methodology of the disclosure to exploit content continuity between cube facets. One facet may be encoded/decoded independently from other facets to obtain a seed facet. One or more transformed versions of the seed facet may be obtained, e.g., via a 90° counterclockwise rotation, via a 90° clockwise rotation, and via a 180° rotation. Transformed versions of the seed facet or previously encoded/decoded facets may be used to form an augmented image. The remaining facets of the cube may then be encoded/decoded using this augmented image. Continuity across one or more boundaries between the transformed facets (within the augmented image) and the currently encoded/decoded facets may be utilized to obtain greater compression efficiency as opposed to the encoding of individual facets independently from one another. This increased compression efficiency may be attributed to intra-prediction or motion prediction across cube boundaries. In some implementations, image and/or video filtering techniques maybe applied to one or more boundaries between transformed facets of a cube or similar projections in order to eliminate artifacts, which may occur as a result of encoding/decoding individual facets at different instances.

FIGS. 4A-5C illustrate encoding of panoramic images, in accordance with some implementations Panel 400 in FIG. 4A presents a planar configuration of a cube projection of a three-dimensional (3D) environment. It is important to state that a cube projection is only explained as one example. In fact, the principles described herein may be readily applied to other polygon projections, such as convex regular polygon projections having a varying number of faces, including, without limitation tetrahedron polygons (having four such faces), dodecahedron polygons (having twelve such faces), and icosahedron polygons (having twenty such faces).

Referring back to FIG. 4A, the projection 400 may include up to six (6) facets (e.g., facets 404, 402, 406, 408, 410, 412). In one implementation, the facets 404, 402, 406, 408, 410, 412 may correspond, respectively, to front, left, right, back, up, down quadrants of 3D space. Individual facets may include representations of one or more objects (e.g., a triangle 418, 420, a rectangle 422, 424, an ellipse 426, 428). When arranged in a planar configuration (e.g., such as that shown in FIG. 4A) transitions across boundaries between one or more facets may be continuous (e.g., boundary 430 between facets 410 and 402); transitions across one or more boundaries may appear discontinuous (e.g., boundaries 414, 416).

Figure 4B:
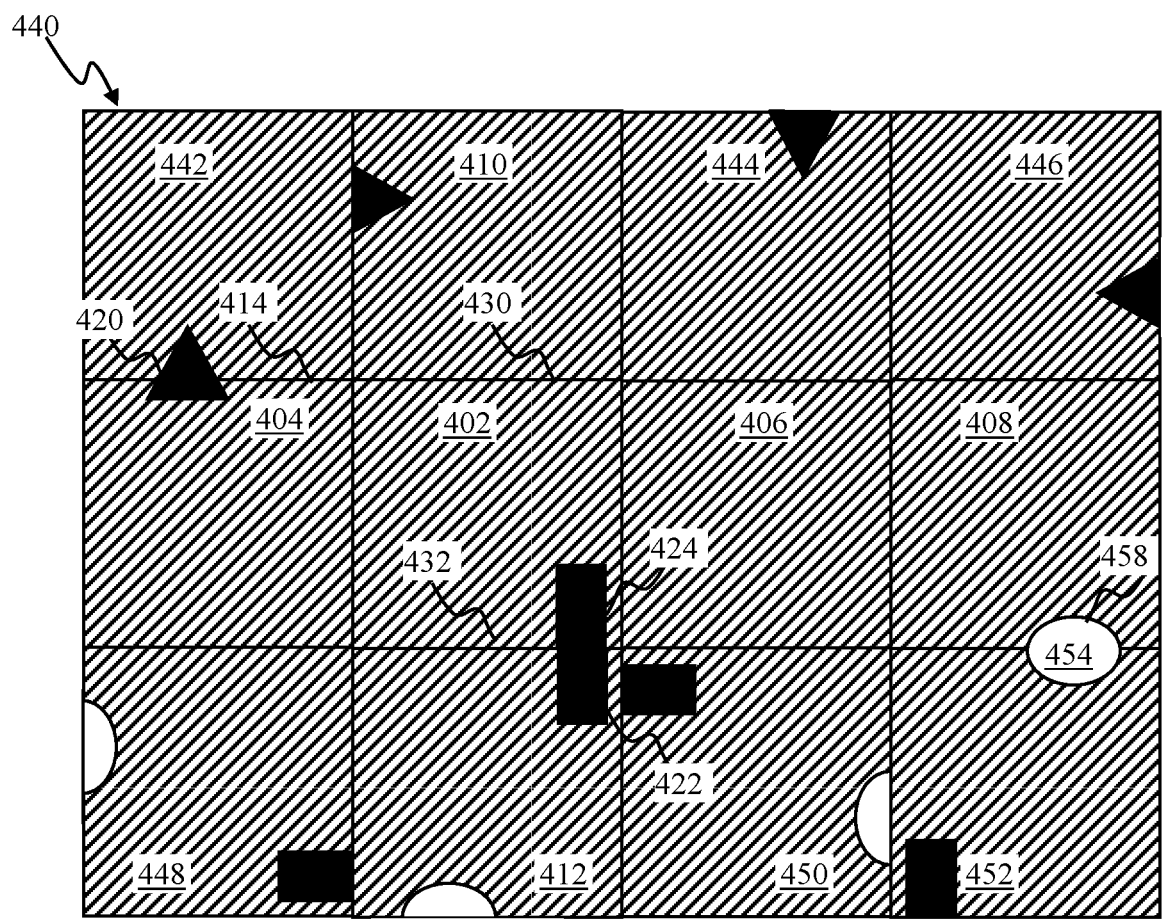
FIG. 4B is a graphical illustration depicting an exemplary augmented image obtained on components of the cube projection of FIG. 4A, in accordance with one implementation.

FIG. 4B illustrates one exemplary configuration of encoding an image obtained from facets the cube projection, e.g., projection 400 shown in of FIG. 4A. The image 440 of FIG. 4B may include the facets 404, 402, 406, 408, 410, 412 shown in FIG. 4A.

In accordance with the methodology of the present disclosure, encoding of a cube projection image may include (i) obtaining an augmented image based on transforming previously encoded/decoded facets of the cube projection and (ii) encoding the current facet from this augmented image. In some implementations, the augmented image may be the same as the reconstructed or decoded images that encoder and/or decoder may maintain.

In some implementations, encoding of the image 440 (e.g., using some existing codecs such as H.264, H.265) may be performed as follows. Image portion (e.g., facet) may be encoded independent from other portions of the image. The encoding may be configured using any applicable codec (e.g., H.264, H.265, HEVC, and/or other codecs). Macroblocks or coding units of the facet 410 may be coded in raster scan order.

By way of an illustration of encoding the image 440, facet 410 may be encoded independent from other portions of the image (e.g., other facets). Encoded version of the facet 410 may be transformed to obtain transformed portions. The transformation may include a rotation, a translation, and/or scaling operations. By way of an illustration using FIG. 4B, the encoded facet 410 may be rotated 90° counterclockwise, and translated left to obtain facet 442; the encoded facet 410 may be rotated 90° clockwise, and translated right to obtain facet 444; the encoded facet 410 may be rotated 180° clockwise/or counterclockwise, and translated right to obtain facet 446.

Image facets 404, 402, 406, 408 may be encoded using any applicable codec. In some implementations, facets 404, 402, 406, 408 may be encoded using e.g., H.264, HEVC, and/or other codecs that are configured to effectuate motion prediction in top-to-bottom and left-to-right directions. By way of an illustration, when encoding the facet 404, motion and/or other characteristics of pixels of the facet 404 below the boundary 414 may be predicted from pixels of the facet 442 above the boundary 414.

Encoding of the image 440 may further include encoding the facet 412. Encoding of the facet 412 may be effectuated using any applicable codec (e.g., H.264, H.265, HEVC, and/or other codec) wherein macroblocks or coding units of the facet 412 may be coded in raster scan order. The facet 412 may be encoded using encoding information (e.g., motion vectors) of the facet 402. Encoded version of the facet 412 may be transformed to obtain transformed portions. The transformation may include rotation, translation, and/or scaling operations. By way of an illustration of FIG. 4B, the encoded facet 412 may be rotated 90° clockwise, and translated left to obtain facet 448; the encoded facet 412 may be rotated 90° counterclockwise, and translated right to obtain facet 450; the encoded facet 412 may be rotated 180° clockwise/or counterclockwise, and translated right to obtain facet 452.

It is noteworthy, that in image 440 facets 442, 444, 446, 448. 450, 452 may not be encoded/decoded and neither may they be transmitted in a bit stream. They are obtained using any transformation operation (e.g., rotation, translation or scaling) of previously encoded/decoded facets. Typically, image rotation, and/or translation may be performed efficiently using a GPU or CPU. Use of such image transformation to obtain portions 442, 444, 446, 448, 450, 452 may use fewer computational and/or energy resources and may result in fewer bits transmitted when compared to encoding/decoding portions 442, 444, 446, 448, 450, 452 as if they were part of the image.

The encoder may signal (and decoder may receive) one or more flags indicating transformation operation for each facet to fill augmented image. The transformation operation could be signaled per sequence, per picture or per facet. The encoder could also choose to pick most optimal transformation per facet that minimizes bits or maximizes image quality of each facet. The augmented (or reconstructed) image 440 may be utilized as a reference image for future coded images. For this case, this augmented picture may be placed in reference picture list. In some implementations, while encoding following frames, the encoder may choose to do motion estimation (and the decoder may do motion compensation) on this image.

Figure 4C:
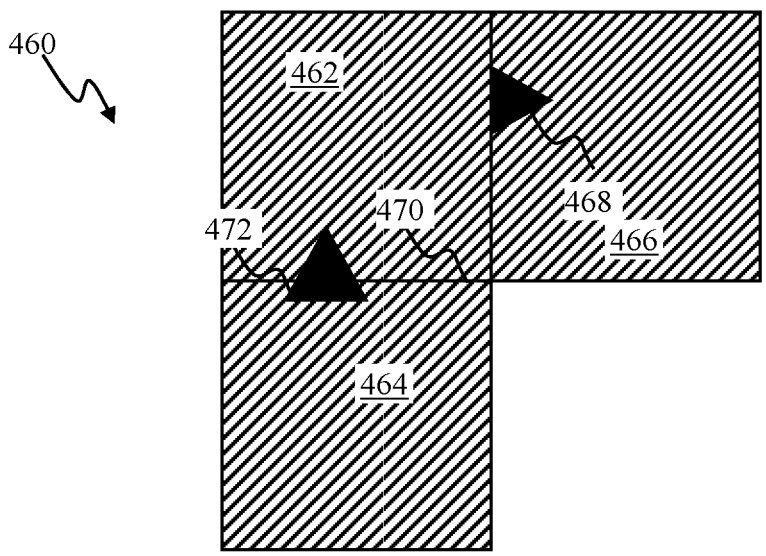
FIG. 4C is a graphical illustration depicting use of encoding methodology of the disclosure for encoding a portion of an image, in accordance with one implementation.

In some implementations, methodology of the disclosure may be utilized for encoding a portion of visual environment. FIG. 4C illustrates encoding of one image portion (e.g., the portion 464) using transformed version of another encoded image portion (e.g., portion 466). The portion 466 may be encoded independently using any applicable codec (e.g., HVEC) that may employ raster pixel scan order. Encoded version of the portion 466 may be rotated 90° counterclockwise and translated left to obtain the portion 462. Placing the transformed portion 462 above the portion 464 may provide for pixel continuity across the boundary 470. This is illustrated by continuity between representations of the triangle 468, 472 across the boundary 470. Use of transformed portion 462 of previously encoded block 466 may enable better intra-prediction because of the pixel continuity across the boundary 470. This will also allow better inter-prediction (when this picture is used as a reference) because an object moving up inside facet 464 will now be properly motion-estimated.

Figure 5A:
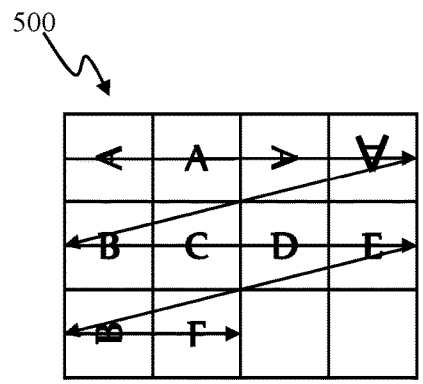
FIG. 5A is a functional block diagram illustrating encoder configuration for intra-mode image compression methodology, in accordance with one implementation.
Figure 5B:
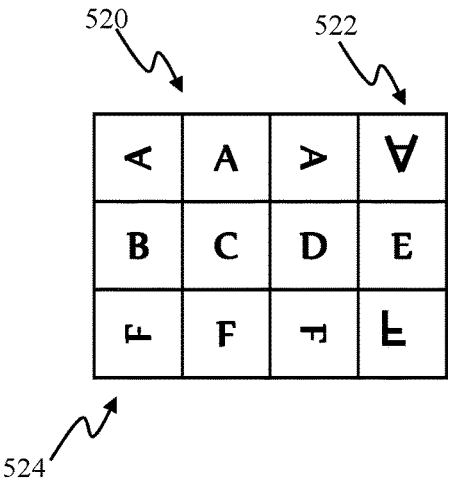
FIG. 5B is a functional block diagram illustrating image encoder configuration for inter-mode image compression methodology, in accordance with one implementation.

The image encoding methodology described herein may enable better inter and/or intra motion estimation compared to existing solutions. Some existing image encoding methods (codecs) e.g., H.264, H.265, HVEC may utilize a block-based encoding approach. Block-based codecs may operate in raster scan order; encoding of an image frame and/or image portion may begin with encoding of the top-left macroblock and proceed in zig-zag fashion until reaching a bottom-right corner. FIGS. 5A-5B illustrate image encoding using block coding. When encoding a block in a middle row of image 500 of FIG. 5A (e.g. block 'C'), information for blocks that lie above and/or to the left may be available. By way of an illustration, when encoding block 'C', motion and pixel information for block 'B', 'A' and/or '◁' may be utilized to obtain higher compression as opposed to encoding block 'C' independent from the other blocks. In some implementations, information from block '⊃' may also be available while encoding block 'C'.

FIG. 5B illustrates inter mode of image encoding using the methodology of the disclosure. In the video compression (encoding) arts, the term inter prediction and/or inter compression mode refers to compressing a frame in a video stream using information from one or more previously encoded/decoded frames (called reference frames). An encoder may choose to use only one reference frame (typically referred to as P picture) or it may choose to use two reference frames (typically called B frame encoding). The invention applies to both P and B frame encoding methodologies. The data that may be used from reference frames may include (but is not limited to) pixels, motion vectors or transform sizes.

When encoding an image using inter mode, a reference frame may include one or more portions of the panoramic image (e.g., portions 442, 410, 444, 446, 404, 402, 406, 408, 448, 412, 450, 452 of FIG. 4B) and/or portions denoted with letters in FIG. 5B. Availability of pixels in the portions of the reference image may be due to previous decoding of the reference image.

Various configurations of the reference frame for inter mode compression may be utilized, such as configuration 520 of FIG. 5B, a configuration wherein portions of the right most column of image 520 (e.g., denoted 522) may be duplicated and appended to the left of the frame 520, and/or other configurations. For inter mode coding, an encoder may search through one or more configurations and select a configuration based on a target performance metric (e.g., encoding time, compression efficiency or image quality).

Figure 5C:
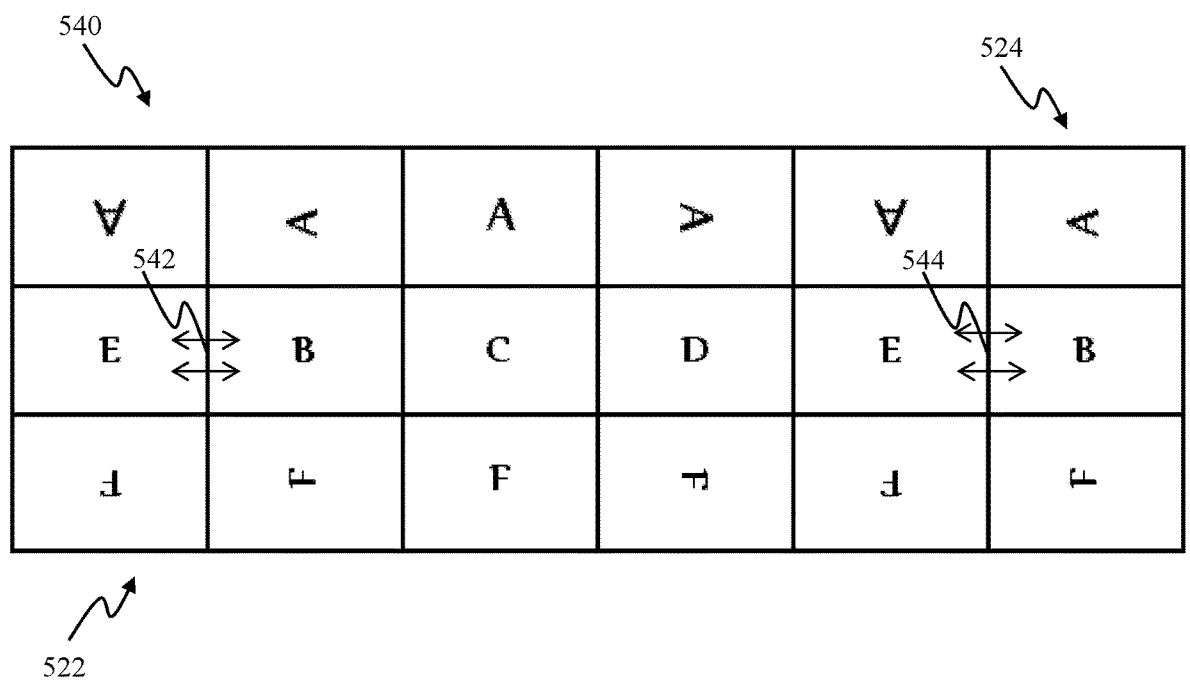
FIG. 5C is a functional block diagram illustrating image encoder configuration for inter-mode image compression methodology, in accordance with one implementation.

FIG. 5C illustrates a configuration for an inter-mode image compression methodology, in accordance with one implementation. Comparing configuration 540 of FIG. 5C and configuration 520 of FIG. 5B, it may be observed that configuration 540 may be obtained from configuration 520 by appending elements of column 522 to the left of the array 520 and elements of column 524 to the right of the array 520. The configuration shown in FIG. 5C may utilize continuity (e.g., color, motion) in order to obtain better prediction and/or higher compression when encoding configuration 540 as compared to encoding configuration 520.

Figure 6:
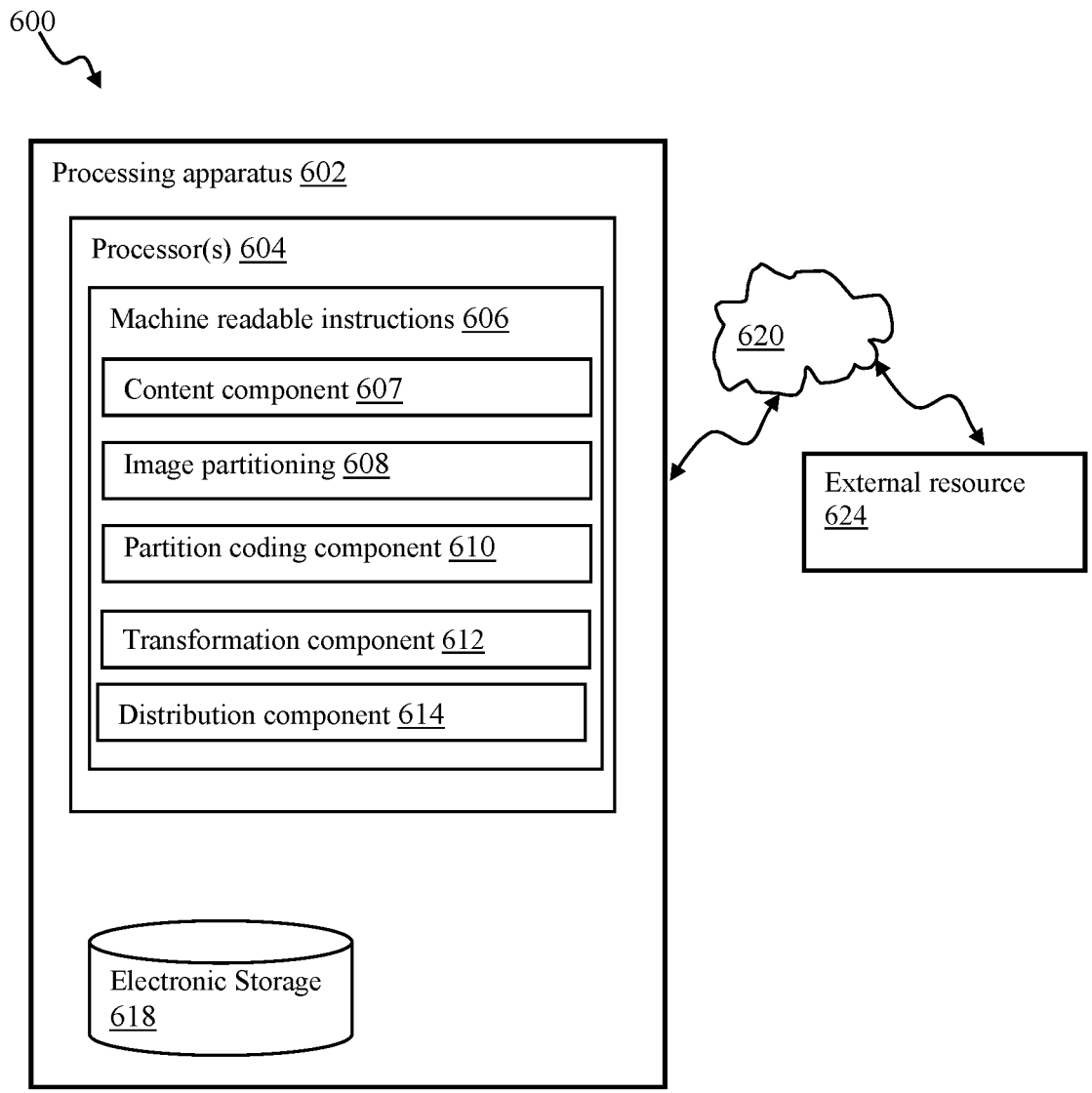
FIG. 6 is a functional block diagram illustrating a system for providing content using compression methodology of the disclosure, in accordance with one implementation.

FIG. 6 illustrates a computerized system for encoding and/or decoding of imaging content using the methodology of the disclosure, in accordance with one implementation. In some implementations, the system 600 may be configured to provide encoded content during content acquisition by a capture device (e.g., 110 of FIG. 1). In one or more implementations, the system 600 may be configured to encode previously acquired content.

The system 600 of FIG. 6 may include a processing apparatus 602 (e.g., including capture apparatus 110 of FIG. 1, capture device 130 of FIG. 2, a computing device in communications with a capture device and/or content depository, a cloud computing apparatus, and/or other apparatus) configured to obtain audio and/or imaging content, e.g., video and/or photos. Content depository may include a network attached storage (NAS), a portable storage (e.g., flash memory), a cloud storage, a server, a personal computer, a DVR, and/or other storage configuration.

The processing apparatus 602 may be in operable communication with one or more remote client devices via one or more data communication interfaces 620. The interface 620 may include one or more wired interfaces (e.g., serial, USB, Thunderbolt™, HDMI, Ethernet, and/or other wired interfaces) and/or wireless interfaces (e.g., WiFi, Bluetooth, cellular, and/or other interfaces). For example, such electronic communication links may be established, at least in part, via one or more networks. In some implementations, a network may include the Internet and/or may employ other communications technologies and/or protocols. By way of a non-limiting example, the interface 620 may employ communication technologies including one or more of Ethernet, 802.11, worldwide interoperability for microwave access (WIMAX), 3G, Long Term Evolution (LTE), digital subscriber line (DSL), asynchronous transfer mode (ATM), InfiniBand, PCI Express Advanced Switching, and/or other communication technologies. By way of non-limiting example, the interface 620 may employ networking protocols including one or more of multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and/or other networking protocols.

Information exchanged over the interface 620 may be represented using formats including one or more of hypertext markup language (HTML), extensible markup language (XML), and/or other formats. One or more exchanges of information between entities of system 600 may be encrypted using encryption technologies including one or more of secure sockets layer (SSL), transport layer security (TLS), virtual private networks (VPNs), Internet Protocol security (IPsec), and/or other encryption technologies. In some implementations, one or more entities of system 600 may use custom and/or dedicated data communications technologies instead of, or in addition to, the ones described above.

The processing apparatus 602 may communicate with (e.g., provide content to) a remote entity. The remote entity may include a user interface device, one or more of a portable communications device (e.g., smartphone, a tablet computer, a laptop computer), a desktop computer, a television set-top box, smart TV, a gaming console, a client computing platform, and/or other platforms), a server, a cable television network node, a cellular data network node, and/or other entity configured to communicate information with the apparatus 602. In some implementations, the system 600 may interface with one or more capture devices, e.g., configured for obtaining panoramic content e.g., such as described in U.S. patent application Ser. No. 14/927,343 entitled "APPARATUS AND METHODS FOR ROLLING SHUTTER COMPENSATION FOR MULTI-CAMERA SYSTEMS" filed on 29 Oct. 2015, incorporated supra.

The processing apparatus 602 may include one or more physical processors 604 configured by machine-readable instructions 606 and/or other components. Executing the machine-readable instructions 606 may cause the one or more physical processors 604 to effectuate encoding/decoding of content using methodology of the disclosure. The machine-readable instructions 606 may include one or more of content component 607, an image partition component 608, a partition coding (e.g., encoding and/or decoding) component 610, a partition transformation component 612, a distribution component 614, and/or other components.

One or more features and/or functions of the processing apparatus 602 may be facilitation of video content acquisition, generation and/or provision of content. It is noted that although the present disclosure is directed to videos and/or video clips, one or more other implementations of system 600 and/or processing apparatus 602 may be configured for other types of media items. By way of non-limiting example, other types of media items may include one or more of audio files (e.g., music, podcasts, audio books, and/or other audio files), documents, photos, multimedia presentations, digital purchases of goods and services, and/or other media items.

The processing apparatus 602 may include communication lines or ports to enable the exchange of information with a network and/or other entities. Illustration of processing apparatus 602 in FIG. 6 is not intended to be limiting. The processing apparatus 602 may include a plurality of hardware, software, and/or firmware components operating together to provide the functionality attributed herein to processing apparatus 602. For example, the processing apparatus 602 may be implemented by a cloud of computing platforms operating together as processing apparatus 602.

The processing apparatus 602 may include electronic storage 618. Electronic storage 618 may include electronic storage media that electronically stores information. The electronic storage media of electronic storage 618 may include one or both of system storage that is provided integrally (i.e., substantially non-removable) with processing apparatus 602 and/or removable storage that is removably connectable to processing apparatus 602 via, for example, a port or a drive. A port may include a USB port, a Firewire port, and/or other port. A drive may include a disk drive and/or other drive. Electronic storage 618 may include one or more of optically readable storage media (e.g., optical disks, etc.), magnetically readable storage media (e.g., magnetic tape, magnetic hard drive, floppy drive, and/or other magnetic storage media), electrical charge-based storage media (e.g., EEPROM, RAM, etc.), solid-state storage media (e.g., flash drive, etc.), and/or other electronically readable storage media. The electronic storage 618 may include one or more virtual storage resources (e.g., cloud storage, a virtual private network, and/or other virtual storage resources). The electronic storage 618 may be configured to store software algorithms, information determined by processor(s) 604, information received from processing apparatus 602, information received from external resource(s), and/or other information that enables processing apparatus 602 to function as described herein.

The system 600 may include an external resource(s) 624 operatively linked via one or more electronic communications interface 620. External resource(s) 624 may include sources of information, hosts, and/or other entities outside of system 600, external entities participating with system 600, computing platforms, and/or other resources. In some implementations, some or all of the functionality attributed herein to external resource(s) 624 may be provided by resources included in system 600.

It will be appreciated that this is not intended to be limiting and that the scope of this disclosure includes implementations in which processing apparatus 602, external resources 624, and/or other entities may be operatively linked via some other communication media.

Processor(s) 604 may be configured to provide information-processing capabilities in processing apparatus 602. As such, processor 604 may include one or more of a digital processor, an analog processor, a digital circuit designed to process information, an analog circuit designed to process information, a state machine, and/or other mechanisms for electronically processing information. Although processor 604 is shown in FIG. 6 as a single entity, this is for illustrative purposes only. In some implementations, processor 604 may include one or more processing units. These processing units may be physically located within a given device; the processor 604 may represent processing functionality of a plurality of devices operating in coordination. The processor 604 may be configured to execute components 607, 608, 610, 612, and/or 614. Processor 604 may be configured to execute components 607, 608, 610, 612, and/or 614 by software; hardware; firmware; some combination of software, hardware, and/or firmware; and/or other mechanisms for configuring processing capabilities on processor 604.

It should be appreciated that although components 607, 608, 610, 612, and/or 614 are illustrated in FIG. 6 as being co-located within a single processing unit, in implementations in which processor 604 includes multiple processing units, one or more of components 607, 608, 610, 612, and/or 614 may be located remotely from the other components. The description of the functionality provided by the different 607, 608, 610, 612, and/or 614 described above is for illustrative purposes and is not intended to be limiting, as any of components 607, 608, 610, 612, and/or 614 may provide more or less functionality than is described. For example, one or more of components 607, 608, 610, 612, and/or 614 may be eliminated, and some or all of its functionality may be provided by other ones of components 607, 608, 610, 612, and/or 614 and/or other components. As an example, processor 604 may be configured to execute one or more additional components that may perform some or all of the functionality attributed below to one of components 607, 608, 610, 612, and/or 614.

In FIG. 6, the content component 607 may be configured to access and/or manage image and/or audio content. In some implementations, the content component 607 may be configured to effectuate image/audio content acquisition using any applicable methodologies including those described herein. By way of an illustration, the content component 607 may be operable to instantiate content acquisition by the capture device 110 based on a timer event, user instruction, or a sensor event. In one or more implementations, the content component 607 may be operable effectuate content acquisition by a VR headset. In some implementations, the content component 607 may be operable to access previously acquired content from, e.g., electronic storage 618 and/or external resource 624 (e.g., external storage, and/or remote user device during content upload). The operations performed by the content component 607 may include information timestamping, adjustment of data rate, transcoding, post processing (e.g., adjusting white balance, sharpening, contrast, gamma and/or other parameters), trimming, and/or other operations. In some implementations, the image/audio content and the metadata may be stored in a multimedia storage container (e.g., MP4, MOV) such as described in detail in U.S. patent application Ser. No. 14/920,427, entitled "APPARATUS AND METHODS FOR EMBEDDING METADATA INTO VIDEO STREAM" filed on 22 Oct. 2015, incorporated supra, and/or in a session container (e.g., such as described in detail in U.S. patent application Ser. No. 15/001,038, entitled "METADATA CAPTURE APPARATUS AND METHODS" filed on 19 Jan. 2016, the foregoing being incorporated herein by reference in its entirety).

In FIG. 6, image partitioning component 608 may be configured to effectuate transformation (e.g., projection) and/or partitioning of one or more source images. In some implementations, the image transformation may include applying a spherical to cube, a fish eye to cube and/or other projection operation (e.g., fisheye to equirectangular, fisheye to cube and/or other transformations). In one implementation, the image partitioning component 608 may be configured to obtain a cubic projection 400 of FIG. 4A, including one or more of portions 410, 404, 402, 406, 408, 412.

In FIG. 6, partition coding component 610 may be configured to effectuate encoding and/or decoding operations for a partition of the image. In some implementations of encoding/decoding a cube projection, the partition coding component 610 may be configured to encode and/or decode one or more portions of the image 400, e.g., facets 410, 404, 402, 406, 408, 412. By way of a non-limiting illustration, the partition coding component 610 may be configured to encode and/or decode portion 410 of image 400. The partition coding component 610 may be implemented using any applicable compression technique, for example macroblocks or coding units may be coded in raster scan order (as in H.264, HVEC, and/or other codec).

In FIG. 6, transformation component 612 may be configured to transform encoded and/or decoded image portion. In some implementations, the transformation may include a rotation, a translation and/or scaling operation(s). By way of an illustration the transformation component 612 may be configured to obtain image portion 442 based on a rotation and translation of encoded/decoded portion 410 of FIG. 4A.

In FIG. 6, a distribution component 614, may be configured to provide encoded/decoded content. The content provision may include storing the content on the electronic storage 618 for viewing; broadcasting content, and/or otherwise delivering content to one or more client devices (e.g., a smartphone) and/or external resource (e.g., cloud storage), and/or other operations.

In some implementations, distribution component 614 and/or other components and/or devices configured to present and/or provide content (e.g., content reconstructed from encoded image portions or facets) may be configured to apply one or more filters to one or more boundaries between encoded/decoded image portions. By way of non-limiting example, a boundary may be boundary 414 between image portion 442 and encoded portion 404 of FIG. 4, and/or other boundary.

In some implementations, boundaries may occur at terminating edges of a reconstructed image that may "meet" when viewed in a 360 degree format. Such a boundary may correspond to an edge that "wraps around" to meet with another edge. By way of non-limiting example, in 360° viewing implementations, a boundary may comprise a boundary defined by a left most edge of facet 404 and a right most edge of facet 408 in FIG. 4B), and/or other boundaries.

In some implementations, one or more filtering techniques may be applied to one or more boundaries between transformed and/or encoded/decoded facets of a cube or similar projection in order to eliminate artifacts which may occur as a result of encoding/decoding individual facets at different instances (e.g., image portion 442 being determined from encoding and transforming facet 410 at one instance in time, facet 404 being encoded based on image portion 442 at a different instance in time, and facet 408 being encoded at yet another instance in time). For example, artifacts that may be present due to the different image portions (e.g., facets) being decoded/encoded at different times may include blocking artifacts and/or other artifacts.

In some implementations, the filtering may comprise in-loop filtering, and/or other techniques. In-loop filtering may include an algorithm that may be the same or similar to one or more of stitching, wiener filtering, smoothening, deblocking, SAO, and/or other techniques.

In some implementations, filtering may be implemented by identifying a set of pixels within a first image facet that may be at or adjacent to a first edge of the first image facet (or set of facets). In particular, the first edge may be an edge of the first image facet that may define and/or otherwise form a boundary with a second edge of a second facet (or set of facets). The identified set of pixels may be copied and/or transposed from the first image facet to a position at or near the second edge of the second image facet (or set of facets) that defines the boundary. A filter may be applied at the second edge using the transposed and/or copied set of pixels. The filtering may provide continuity at the transition from pixels of the first facet over the boundary to pixels of the second image facet. This may be due to the second edge being smoothed to account for the pixels of the first facet that are at the boundary as well (and have been transposed or copied to the second facet).

Figure 9:
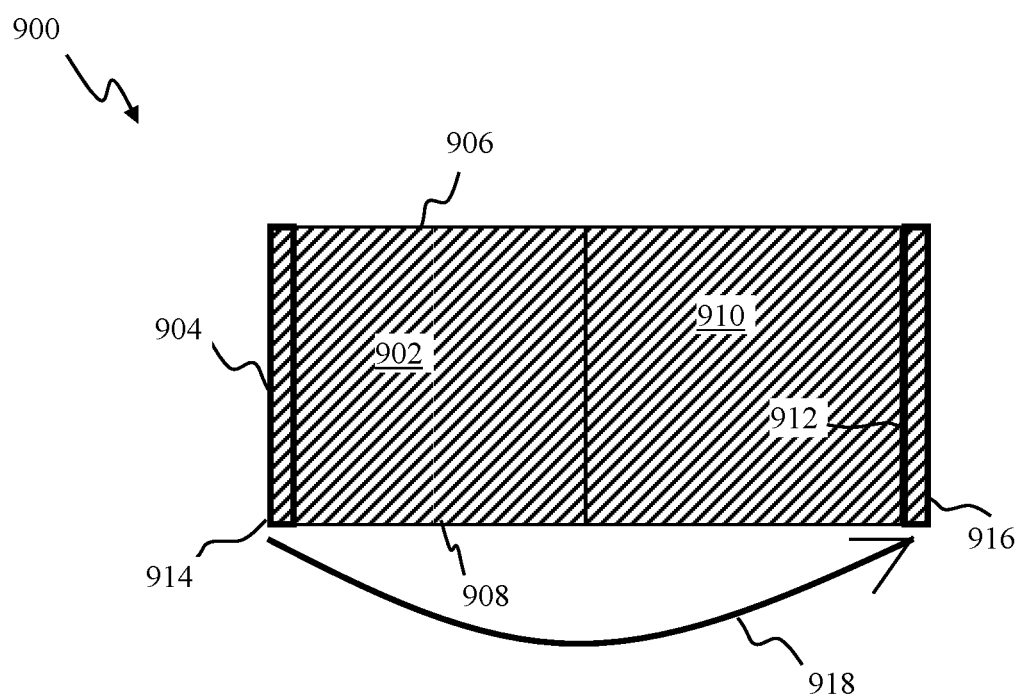
FIG. 9 is a graphical illustration depicting use of encoding methodology of the disclosure for reconstructing an encoded image using boundary filtering, in accordance with one implementation.

By way of non-limiting illustration in FIG. 9, consider a reconstruction of an encoded image 900 used for 360 degree viewing implementations. Image 900 may include one or more image portions, or facets, e.g., first image facet 902 and second image facet 910. Image 900 may be reconstructed by decoding the individual first image facet 902 and the second image facet 910. In some implementations, when viewing image 900, a boundary may occur at first terminating edge 904 of the first image facet 902 and a second terminating edge 912 of the second image facet. For example, the view of image 900 may "wrap around" at the boundary where first terminating edge 904 and second terminating edge 912 meet. In some implementations, given that first image facet 902 may have been encoded at a different instance than the second image facet 910 (e.g., the first image facet 902 being encoded independently from the second image facet 910), there may be discontinuities and/or artifacts at the boundary where the first terminating edge 904 and second terminating edge 912 meet. One or more techniques in which smoothing filters may be applied to one or both of the first terminating edge 904 and/or second terminating edge 912 may correct for such discontinuities and/or artifacts.

By way of non-limiting illustration, a first set of pixels 914 of the first image facet 902 may be identified. The first set of pixels 914 may comprise pixels that may be at and/or near first terminating edge 904 of first image facet 902. The first set of pixels 914 may comprise pixels that are directly adjacent to first terminating edge 904 (e.g., may abut first terminating edge 904). By way of non-limiting illustration, the first set of pixels 914 may comprise one or more columns of pixels, for example eight (8) columns of pixels, that may be adjacent first terminating edge 904 and/or may span the length of first terminating edge (e.g., a column of pixels along first terminating edge 904 that may be eight (8) pixels deep starting from first terminating edge 904, and/or other pixels). It is noted that the description of a column of pixels is provided for illustrative purposes only and is not to be considered limiting. For example, in some implementations, the first set of pixels may comprise any N×M area of pixels suitable for a given filter, where N and M may or may not be equal to one another.

In some implementations, a first set of pixels 904 may be transposed or copied (shown by arrow 918) to a position at second terminating edge 912 of second image facet 910. This is illustrated as a transposed first set of pixels 916 (however could instead by copied as opposed to transposed). In some implementations, the position of the transposed first set of pixels 916 may be at and/or near second terminating edge 912 but not within second image facet 910. In some implementations, the position of transposed first set of pixels 916 may be at and/or near second terminating edge 912 and may overlap a portion of second image facet 910. The positioning of transposed first set of pixels 916 at second terminating edge may provide the boundary that may otherwise be defined when first terminating edge 904 "wraps around" to meet the second terminating edge 912. The boundary now generated at the second terminating edge 912 including transposed first set of pixels 916 may be filtered to correct for potential artifacts.

By way of non-limiting illustration, a filter may be applied to smooth the pixels around second terminating edge 912 using pixels within second image facet 910 (and adjacent second terminating edge 912) and pixels included in transposed first set of pixels 916. It is noted that an opposite iteration of boundary smoothing may take place by identifying and transposing (or copying) a set of pixels from the second image facet 910 (either before or after being smoothed using the transposed first set of pixels 916) to a position at or near first terminating edge 904, and applying a filter there in a same or similar manner as described above.

Further, it is noted that although FIG. 9 illustrates a boundary smoothing technique for opposing side edges of image 900 this is for illustrative purposes only and should not to be considered limiting. For example, the same or similar technique may be applied for other edges of facets that may "meet" to define a boundary. By way of non-limiting example, a same or similar technique for boundary smoothing may be carried for a "wrap around" boundary that may be defined by a top terminating edge 906 and a bottom terminating edge 908 of first image facet 902, and/or other edges of facets of image 900.

Figure 7A:
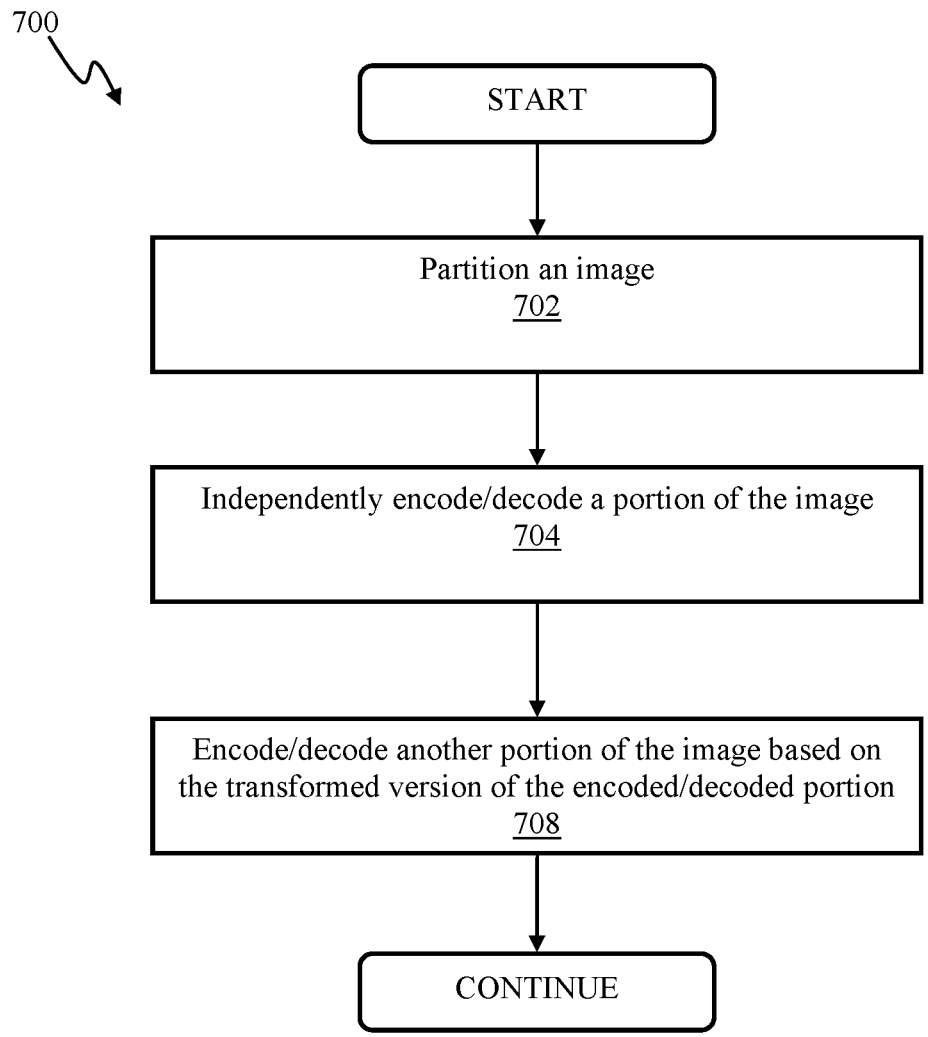
FIGS. 7A-7B are logical flow diagram illustrating methods for image encoding and/or decoding in accordance with some implementation of the present disclosure.
Figure 7B:
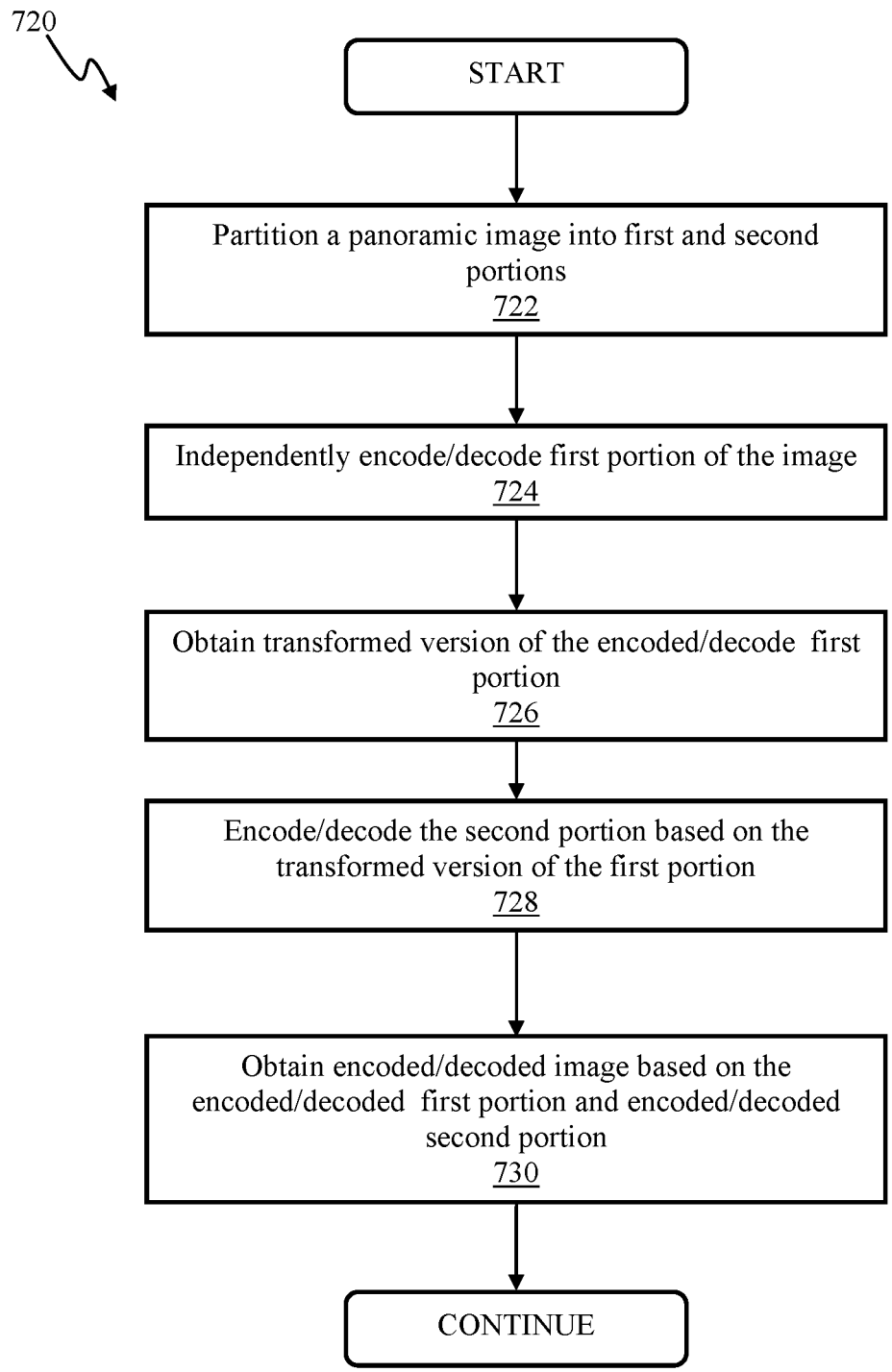

FIGS. 7A-7B illustrate methods 700, 720 for encoding and/or decoding of content in accordance with some implementations of the present disclosure. The operations of methods 700, 720 presented below are intended to be illustrative. In some implementations, methods 700, 720 may be accomplished with one or more additional operations not described, and/or without one or more of the operations discussed. Additionally, the order in which the operations of methods 700, 720 are illustrated in FIG. 7 and described below is not intended to be limiting.

In some implementations, methods 700, 720 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of methods 700, 720 in response to instructions stored electronically on an electronic storage medium. The one or more processing devices may include one or more devices configured through hardware, firmware, and/or software to be specifically designed for execution of one or more of the operations of methods 700, 720. Operations of methods 700, 720 may be effectuated by one or more devices and/or computerized systems including those described with respect to FIGS. 1-2 and/or FIG. 6

FIG. 7A illustrates a method of image encoding and/or decoding using image partitioning methodology of the disclosure, in accordance with some implementations. Method 700 of FIG. 7A may be implemented by, e.g., system 600 of FIG. 6.

At operation 702 of method 700, an image may be partitioned. In some implementations, the image may correspond to an image of a sequence of images and/or image of a video stream. The image may include a cube projection (or a portion thereof), e.g., such as those described with respect to FIG. 4A and/or FIG. 4C. Image partitioning operation may include selecting one or more facets of the cubic projection. In some implementations, individual facets may be organized in a structure, a 2-dimensional array, a 3-dimensional array, a vector of pixels, and/or other configuration(s). Image partitioning may include operation of selecting a range of pixels corresponding to given facet (e.g., 410, 412 of FIGS. 4A-4B, 466 of FIG. 4C).

At operation 704 of method 700, an image partition may be encoded and/or decoded independent from one or more other partitions of the image. Encoding/decoding operation 704 may be configured using any applicable encoder configuration, e.g., H.264, HVEC, and/or other codec(s). Encoding/decoding of the image portion at operation 704 may be configured independent from other portions of image. By way of an illustration, facet 410 of image 400 may be encoded/decoded independent from other facet(s) of the image.

At operation 708, another portion of the image may be encoded and/or decoded. Encoding/decoding operation 708 may be configured based on the transformed version of the encoded/decoded portion obtained at operation 704. By way of an illustration, encoded facet 410 may be rotated and/or translated to obtain facets 442, 444, 446. Facet 404 may be encoded using cross boundary 414 prediction from encoded information of facet 442.

FIG. 7B illustrates a method for encoding/decoding a portion of an image based on a transformed version of another encoded/decoded portion in accordance with some implementation of the present disclosure.

At operation 722 of method 720 a panoramic image may be partitioned into first and second portions. Image partitioning may include, for example, obtaining facets 410, 404 of FIG. 4A and/or 466, 464 of FIG. 4C. In some implementations, operation 722 may include obtaining one or more additional portions of the image (e.g., facets 402, 406, 408, 412 of FIG. 4A.

At operation 724 the first portion of the image may be encoded/decoded independently from other portion(s) of the image. Encoding/decoding operation 724 may be configured using any applicable encoder configuration, e.g., H.264, HVEC, and/or other codec.

At operation 726, a transformed version of the encoded first portion may be obtained. In some implementations, the transformation operation 726 may include one or more of a rotation, a scaling, and/or translation operation(s). By way of an illustration, the transformation operation 726 may include a 90° counter clockwise rotation and translation to obtain transformed encoded/decoded image portion 462 from the encoded/decoded image portion 466 of FIG. 4C.

At operation 728, the second portion of the image may be encoded/decoded based on the transformed version of the first portion. Encoding/decoding operation 728 may be configured using any applicable encoder configuration, e.g., H.264, HVEC, and/or other codec(s). By way of an illustration, image portion 464 of FIG. 4C may be encoded using information of the transformed portion 462 across, e.g., boundary 470 thereby obtaining a greater compression rate, and/or a higher compression quality for encoding of the portion 464 compared to encoding/decoding the portion 464 independently.

At operation 730, an encoded/decoded image may be obtained based on the encoded/decoded first portion and encoded/decoded second portion. By way of illustration, operation 730 may be configured to produce an image that may include a side view and a top view of the cubic panoramic projection.

Figure 10:
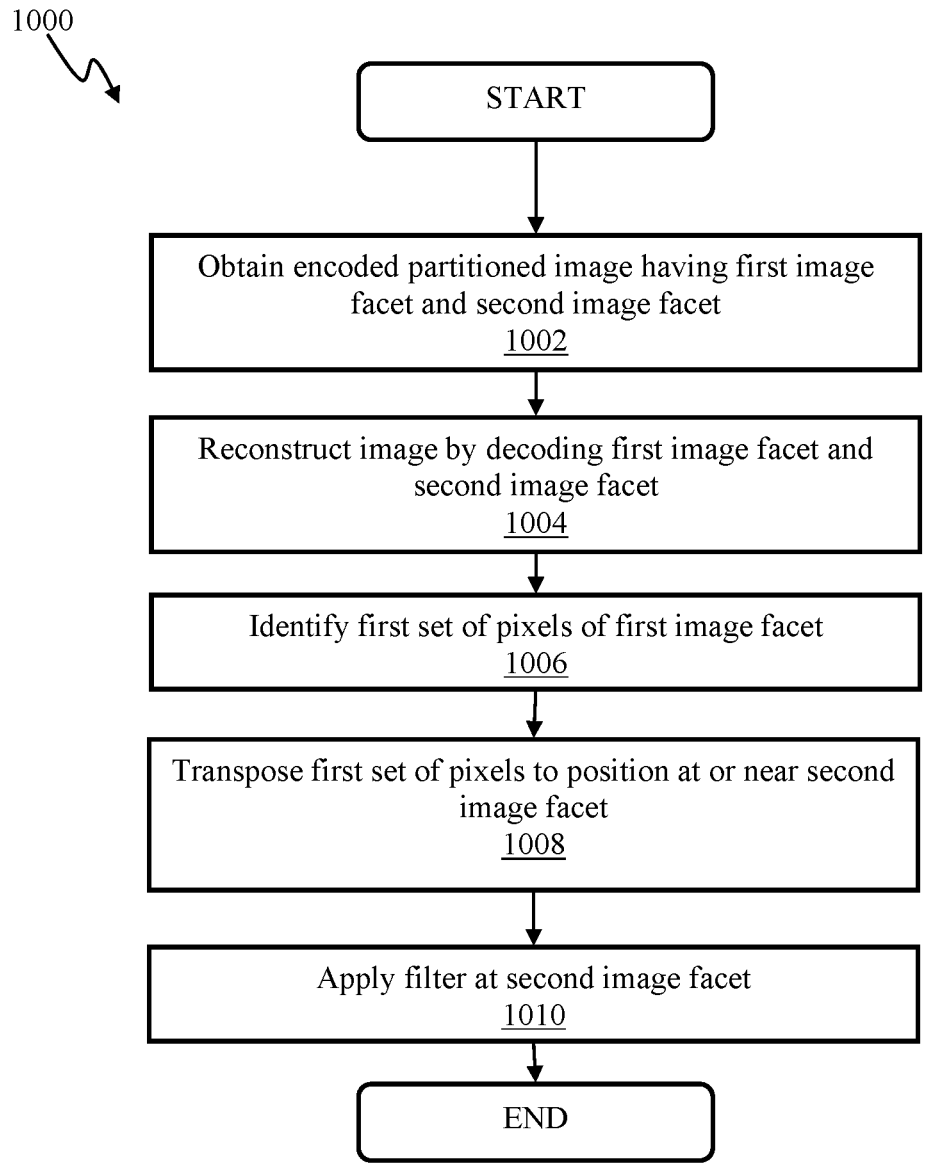
FIG. 10 is a logical flow diagram illustrating a method of boundary filtering of encoded images to reduce artifacts at image boundaries, in accordance with one or more implementations.

FIG. 10 illustrates a method of boundary filtering of encoded images to reduce artifacts at image boundaries, in accordance with some implementation of the present disclosure. The operations of method 1000 presented below are intended to be illustrative. In some implementations, method 1000 may be accomplished with one or more additional operations not described, and/or without one or more of the operations discussed. Additionally, the order in which the operations of method 1000 are illustrated in FIG. 10 and described below is not intended to be limiting.

In some implementations, method 1000 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 1000 in response to instructions stored electronically on an electronic storage medium. The one or more processing devices may include one or more devices configured through hardware, firmware, and/or software to be specifically designed for execution of one or more of the operations of method 1000. Operations of method 1000 may be effectuated by one or more devices and/or computerized systems including those described with respect to FIGS. 1-2 and/or FIG. 6

An operation 1002, an encoded partitioned image may be obtained. The image may include one or more image facets. The one or more image facets may include one or more of a first image facet, a second image facet, and/or other facets and/or portions. The first image facet may have a first edge and/or other edges and/or features. The second image facet may have a second edge and/or other edges and/or features. The first edge and second edge may define a boundary. By way of non-limiting illustration, operation 1002 may obtain image 900 of FIG. 9, and/or other images.

At an operation 1004, the encoded partitioned image obtained at operation 1002 may be reconstructed. The image may be reconstructed by decoding individual image facets and/or other portions of the image. By way of non-limiting illustration, operation 1004 may decode first image facet 902 and second image facet 910 of image 900 in FIG. 1, and/or other images and/or image facets.

At operation 1006, a set of pixels at or near a terminating edge of an image facet may be identified. By way of non-limiting illustration, operation 1006 may identify a first set of pixels 914 of first image facet 902.

At operation 1008, the set of pixels identified at operation 1006 may be transposed and/or copied to a position at or near another edge of another image facet. By way of non-limiting illustration, operation 1006 may transpose a first set of pixels 914 to a position at or near second terminating edge of second image facet 910.

At operation 1010, a smoothing filter may be applied at the other edge of the other image facet using the transposed set of pixels, and/or other information. By way of non-limiting illustration, operation 1010 may apply a smoothing filter at second terminating edge 912 of second image facet 910 using transposed first set of pixels 916 in FIG. 9, and/or other information.

Where certain elements of these implementations can be partially or fully implemented using known components, only those portions of such known components that are necessary for an understanding of the present disclosure are described, and detailed descriptions of other portions of such known components are omitted so as not to obscure the disclosure.

In the present specification, an implementation showing a singular component should not be considered limiting; rather, the disclosure is intended to encompass other implementations including a plurality of the same or similar component, and vice-versa, unless explicitly stated otherwise herein.

Further, the present disclosure encompasses present and future known equivalents to the components referred to herein by way of illustration.

As used herein, the terms "computer", "computing device", and "computerized device", include, but are not limited to, personal computers (PCs) and minicomputers, whether desktop, laptop, or otherwise, mainframe computers, workstations, servers, personal digital assistants (PDAs), handheld computers, embedded computers, programmable logic device, personal communicators, tablet computers, portable navigation aids, J2ME equipped devices, cellular telephones, smart phones, personal integrated communication or entertainment devices, or literally any other device capable of executing a set of instructions.

As used herein, the term "computer program" or "software" is meant to include any sequence or human or machine cognizable steps which perform a function. Such program may be rendered in virtually any programming language or environment including, for example, C/C++, C#, Fortran, COBOL, MATLAB™, PASCAL, Python, assembly language, markup languages (e.g., HTML, SGML, XML, VoXML), and the like, as well as object-oriented environments such as the Common Object Request Broker Architecture (CORBA), Java™ (including J2ME, Java Beans), Binary Runtime Environment (e.g., BREW), and the like.

As used herein, the terms "connection", "link", and "wireless link" means a causal link between any two or more entities (whether physical or logical/virtual), which enables information exchange between the entities.

As used herein, the terms "integrated circuit", "chip", and "IC" are meant to refer to an electronic circuit manufactured by the patterned diffusion of trace elements into the surface of a thin substrate of semiconductor material. By way of non-limiting example, integrated circuits may include field programmable gate arrays (e.g., FPGAs), a programmable logic device (PLD), reconfigurable computer fabrics (RCFs), systems on a chip (SoC), application-specific integrated circuits (ASICs), and/or other types of integrated circuits.

As used herein, the term "memory" includes any type of integrated circuit or other storage device adapted for storing digital data including, without limitation, ROM. PROM, EEPROM, DRAM, Mobile DRAM, SDRAM, DDR/2 SDRAM, EDO/FPMS, RLDRAM, SRAM, "flash" memory (e.g., NAND/NOR), memristor memory, and PSRAM.

As used herein, the terms "microprocessor" and "digital processor" are meant generally to include digital processing devices. By way of non-limiting example, digital processing devices may include one or more of digital signal processors (DSPs), reduced instruction set computers (RISC), general-purpose (CISC) processors, microprocessors, gate arrays (e.g., field programmable gate arrays (FPGAs)), PLDs, reconfigurable computer fabrics (RCFs), array processors, secure microprocessors, application-specific integrated circuits (ASICs), and/or other digital processing devices. Such digital processors may be contained on a single unitary IC die, or distributed across multiple components.

As used herein, the term "network interface" refers to any signal, data, and/or software interface with a component, network, and/or process. By way of non-limiting example, a network interface may include one or more of FireWire (e.g., FW400, FW110, and/or other variation.), USB (e.g., USB2), Ethernet (e.g., 10/100, 10/100/1000 (Gigabit Ethernet), 10-Gig-E, and/or other Ethernet implementations), MoCA, Coaxsys (e.g., TVnet™), radio frequency tuner (e.g., in-band or OOB, cable modem, and/or other protocol), Wi-Fi (802.11), WiMAX (802.16), PAN (e.g., 802.15), cellular (e.g., 3G, LTE/LTE-A/TD-LTE, GSM, and/or other cellular technology), IrDA families, and/or other network interfaces.

As used herein, the term "Wi-Fi" includes one or more of IEEE-Std. 802.11, variants of IEEE-Std. 802.11, standards related to IEEE-Std. 802.11 (e.g., 802.11 a/b/g/n/s/v), and/or other wireless standards.

As used herein, the term "wireless" means any wireless signal, data, communication, and/or other wireless interface. By way of non-limiting example, a wireless interface may include one or more of Wi-Fi, Bluetooth, 3G (3GPP/3GPP2), HSDPA/HSUPA, TDMA, CDMA (e.g., IS-95A, WCDMA, and/or other wireless technology), FHSS, DSSS, GSM, PAN/802.15, WiMAX (802.16), 802.20, narrowband/FDMA, OFDM, PCS/DCS, LTE/LTE-A/TD-LTE, analog cellular, CDPD, satellite systems, millimeter wave or microwave systems, acoustic, infrared (i.e., IrDA), and/or other wireless interfaces.

As used herein, the term "camera" may be used to refer to any imaging device or sensor configured to capture, record, and/or convey still and/or video imagery, which may be sensitive to visible parts of the electromagnetic spectrum and/or invisible parts of the electromagnetic spectrum (e.g., infrared, ultraviolet), and/or other energy (e.g., pressure waves).

It will be recognized that while certain aspects of the technology are described in terms of a specific sequence of steps of a method, these descriptions are only illustrative of the broader methods of the disclosure, and may be modified as required by the particular application. Certain steps may be rendered unnecessary or optional under certain circumstances. Additionally, certain steps or functionality may be added to the disclosed implementations, or the order of performance of two or more steps permuted. All such variations are considered to be encompassed within the disclosure disclosed and claimed herein.

While the above detailed description has shown, described, and pointed out novel features of the disclosure as applied to various implementations, it will be understood that various omissions, substitutions, and changes in the form and details of the device or process illustrated may be made by those skilled in the art without departing from the disclosure. The foregoing description is of the best mode presently contemplated of carrying out the principles of the disclosure. This description is in no way meant to be limiting, but rather should be taken as illustrative of the general principles of the technology. The scope of the disclosure should be determined with reference to the claims.

What is claimed is:

1. A method for image encoding, the method comprising:
generating an image projection based at least on a captured imaging content;
encoding a first portion of the image projection;
decoding the encoded first portion to obtain a decoded first portion;
generating a transformed version of the decoded first portion of the image projection; and
encoding a second portion of the image projection using at least the transformed version of the decoded first portion.

2. The method of claim 1, wherein the captured imaging content comprises one or more three-dimensional representations, and the generated image projection comprises a two-dimensional projection thereof.

3. The method of claim 2, wherein the generating of the image projection comprises converting at least one of the one or more three-dimensional representations into a cubic projection, the cubic projection having six facets.

4. The method of claim 3, further comprising capturing the imaging content via an image-capture apparatus comprising a plurality of cameras, each of the plurality of cameras corresponding to one or more of the six facets of the cubic projection.

5. The method of claim 1, wherein:
the image projection comprises a cube projection;
the first portion of the image projection comprises a first facet of the cube projection;
the second portion of the image projection comprises a second facet of the cube projection; and
content continuity exists across at least one boundary associated with the first and second facets of the cube projection.

6. The method of claim 1, wherein the generating of the transformed version of the decoded first portion of the image projection comprises rotating or translating the decoded first portion of the image projection, the rotating or the translating enabling an alignment of the generated transformed version with the second portion of the image projection.

7. The method of claim 1, wherein the encoding of the second portion of the image projection comprises enabling one or more of (i) intra-prediction of motion associated with at least a portion of the captured imaging content, or (ii) inter-prediction of motion associated with one or more frames of the captured imaging content with respect to at least one reference frame of the captured imaging content, the at least one reference frame comprising at least a portion of the image projection.

8. A computerized apparatus configured to encode imaging content, the computerized apparatus comprising:
image-capture apparatus configured to capture the imaging content;
storage apparatus configured to at least store the imaging content; and
a processor configured to:
retrieve the imaging content;
obtain a projection of the imaging content;
encode a first portion of the projection;
decode the first portion to obtain a decoded first portion;
duplicate and transform the decoded first portion of the projection to obtain a transformed portion of the projection; and
encode a second portion of the projection using at least the transformed decoded first portion of the projection.

9. The computerized apparatus of claim 8, wherein the transformation of the decoded first portion comprises at least a 90-degree rotation.

10. The computerized apparatus of claim 8, wherein projection of the imaging content comprises a cubic projection having six facets, a first facet of the six facets comprising the first portion of the projection, a second facet of the six facets comprising athe second portion of the projection.

11. The computerized apparatus of claim 10, wherein to encode the second portion of the projection using at least the transformed decoded first portion comprises to: enable pixel continuity across one or more of a boundary of the first facet or a boundary of the second facet.

12. The computerized apparatus of claim 11, wherein the pixel continuity enables intra-prediction across the one or more of the boundary of the first facet or the boundary of the second facet.

13. The computerized apparatus of claim 11, wherein the pixel continuity enables inter-prediction of motion across a plurality of frames associated with the captured imaging content.

14. The computerized apparatus of claim 8, wherein:
the processor is further configured to encode a third portion of the projection using imaging information associated with one or more other portions of the projection, the one or more other portions comprising the first portion and the second portion; and
to encode the third portion using the imaging information enables higher compression of the third portion relative to a compression associated with encoding of the third portion independent from the first and second portions.

15. The computerized apparatus of claim 8, wherein:
the projection comprises a panoramic image;
the processor is further configured to partition the panoramic image into at least the first and second portions; and
the encode of the first portion of the projection comprises an encode that is independent from other portions of the projection, the other portions including the second portion.

16. A non-transitory computer-readable apparatus comprising a storage medium, the storage medium comprising a plurality of computer-executable instructions, the plurality of computer-executable instructions being configured to, when executed by a processor apparatus, cause a computerized apparatus to:
obtain imaging content via a spherical camera apparatus;
obtain a two-dimensional projection from the imaging content, the two-dimensional projection comprising a plurality of facets;
encode a first facet of the two-dimensional projection;
decode the encoded first facet to obtain a decoded first facet;
transform the decoded first facet of the two-dimensional projection; and
encode a second facet of the two-dimensional projection using at least the decoded first facet of the two-dimensional projection.

17. The computer-readable apparatus of claim 16, wherein:
the transformation of the decoded first facet of the two-dimensional projection comprises a rotation or a translation of the decoded first facet; and
the translation comprises an appending of a rotated version of the decoded first facet of the two-dimensional projection to the second facet.

18. The computer-readable apparatus of claim 16, wherein:
the camera apparatus comprises a plurality of cameras configured to maintain an orientation with respect to one another;
a first one of the plurality of cameras is configured to capture image data corresponding to at least the first facet of the two-dimensional projection; and
a second one of the plurality of cameras is configured to capture image data corresponding to at least the second facet of the two-dimensional projection.

19. The computer-readable apparatus of claim 16, wherein the transformation of the decoded first facet of the two-dimensional projection comprises one or more of (i) a transpose of a portion of the decoded first facet such that the portion of the decoded first facet is placed adjacent to an edge of the second facet, or (ii) a duplication of a portion of the decoded first facet such that a duplicated version of the portion is placed adjacent to the edge of the second facet.

20. The computer-readable apparatus of claim 19, wherein the plurality of computer-executable instructions is further configured to, when executed by the processor apparatus, cause the computerized apparatus to, subsequent to the transpose or the duplication, apply a smoothing filter to one or more of (i) the edge of the second facet, (ii) the transposed portion, (iii) or the duplicated portion.

21. The computer-readable apparatus of claim 16, wherein the plurality of computer-executable instructions is further configured to, when executed by the processor apparatus, cause the computerized apparatus to:
independently decode the first facet of the two-dimensional projection;
generate a transformed version of the decoded first facet of the two-dimensional projection; and
decode the second facet of the two-dimensional projection using at least the transformed version of the decoded first facet of the two-dimensional projection.

* * * * *